United States Patent
Solheim et al.

(10) Patent No.: US 10,963,526 B2
(45) Date of Patent: *Mar. 30, 2021

(54) TECHNIQUES FOR MANAGING WRITABLE SEARCH RESULTS

(71) Applicant: Microsoft Technology Licensing, LLC, Redmond, WA (US)

(72) Inventors: Helge Grenager Solheim, Oslo (NO); Bjorn Olstad, Oslo (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 251 days.

This patent is subject to a terminal disclaimer.

(21) Appl. No.: 16/116,444

(22) Filed: Aug. 29, 2018

(65) Prior Publication Data
US 2019/0026375 A1 Jan. 24, 2019

Related U.S. Application Data

(63) Continuation of application No. 14/083,376, filed on Nov. 18, 2013, now Pat. No. 10,102,288.

(51) Int. Cl.
*G06F 16/9535* (2019.01)
*G06F 16/93* (2019.01)
(Continued)

(52) U.S. Cl.
CPC ........ *G06F 16/9535* (2019.01); *G06F 16/335* (2019.01); *G06F 16/3326* (2019.01); *G06F 16/9038* (2019.01); *G06F 16/93* (2019.01)

(58) Field of Classification Search
None
See application file for complete search history.

(56) References Cited

U.S. PATENT DOCUMENTS

| 10,503,835 B2* | 12/2019 | Neff | G06F 40/169 |
| 2009/0182863 A1* | 7/2009 | O'Sullivan | G06Q 30/02 |
| | | | 709/224 |

(Continued)

FOREIGN PATENT DOCUMENTS

| CN | 1750002 A | 3/2006 |
| CN | 101404018 A | 4/2009 |
| CN | 102016845 A | 4/2011 |

OTHER PUBLICATIONS

Poonam Bhusari et al "Personalized Image Search from Photo Sharing Websites Using Ranking Based Tensor Factorization Model (RMTF)", IJARCSSE vol. 3, Issue 8, ISSN: 2277 128X, Aug. 2013, pp. 652-656.*

(Continued)

*Primary Examiner* — Uyen T Le
(74) *Attorney, Agent, or Firm* — Merchant & Gould P.C.

(57) ABSTRACT

Techniques for shared writable search results using a writable topic board system are described. An apparatus may include a processor circuit; and a server application for execution by the processor circuit. The server application may include a query processing component to receive a first search query include one or more search terms, a search component to provide search results for the first search query in a search result list, the search results include one or more search result items, and a topic board component to manage a writable topic board for the first search query, the writable topic board to include one or more search result items from a second search query. Other embodiments are described and claimed.

20 Claims, 17 Drawing Sheets

*Topic Board System 100*

(51) Int. Cl.
*G06F 16/335* (2019.01)
*G06F 16/332* (2019.01)
*G06F 16/9038* (2019.01)

(56) References Cited

U.S. PATENT DOCUMENTS

| | | | | |
|---|---|---|---|---|
| 2009/0183176 | A1* | 7/2009 | O'Sullivan | H04L 51/24 |
| | | | | 719/318 |
| 2012/0143829 | A1 | 6/2012 | Fontenot et al. | |
| 2013/0054570 | A1* | 2/2013 | Gonzales | G06F 21/6218 |
| | | | | 707/722 |
| 2015/0112996 | A1* | 4/2015 | Mishra | G06F 16/134 |
| | | | | 707/741 |
| 2015/0120700 | A1* | 4/2015 | Holm | G06F 16/248 |
| | | | | 707/722 |

OTHER PUBLICATIONS

"Third Office Action Issued in Chinese Patent Application No. 201480062990.X", dated Dec. 20, 2019, 15 Pages.
"Office Action Issued In Chinese Application No. 201480062990.X", dated Sep. 20, 2018, 18 Pages.
"Second Office Action Issued in Chinese Patent Application No. 201480062990.X", dated Jun. 17, 2019, 13 Pages.
"Notice of Allowance Issued in Chinese Patent Application No. 201480062990.X", dated Jun. 4, 2020, 8 Pages.
Sang et al., "Learn to Personalized Image Search From the Photo Sharing Websites", In Journal of IEEE Transactions on Multimedia, vol. 14, Issue 4, Dec. 22, 2011, pp. 963-974.
Chen, Xiangxiang, "Interest-based Search Scheme for Unstructured P2P Network", In Journal of Application Research of Computers, vol. 28, Issue 1, Jan. 2011, 5 Pages.

* cited by examiner

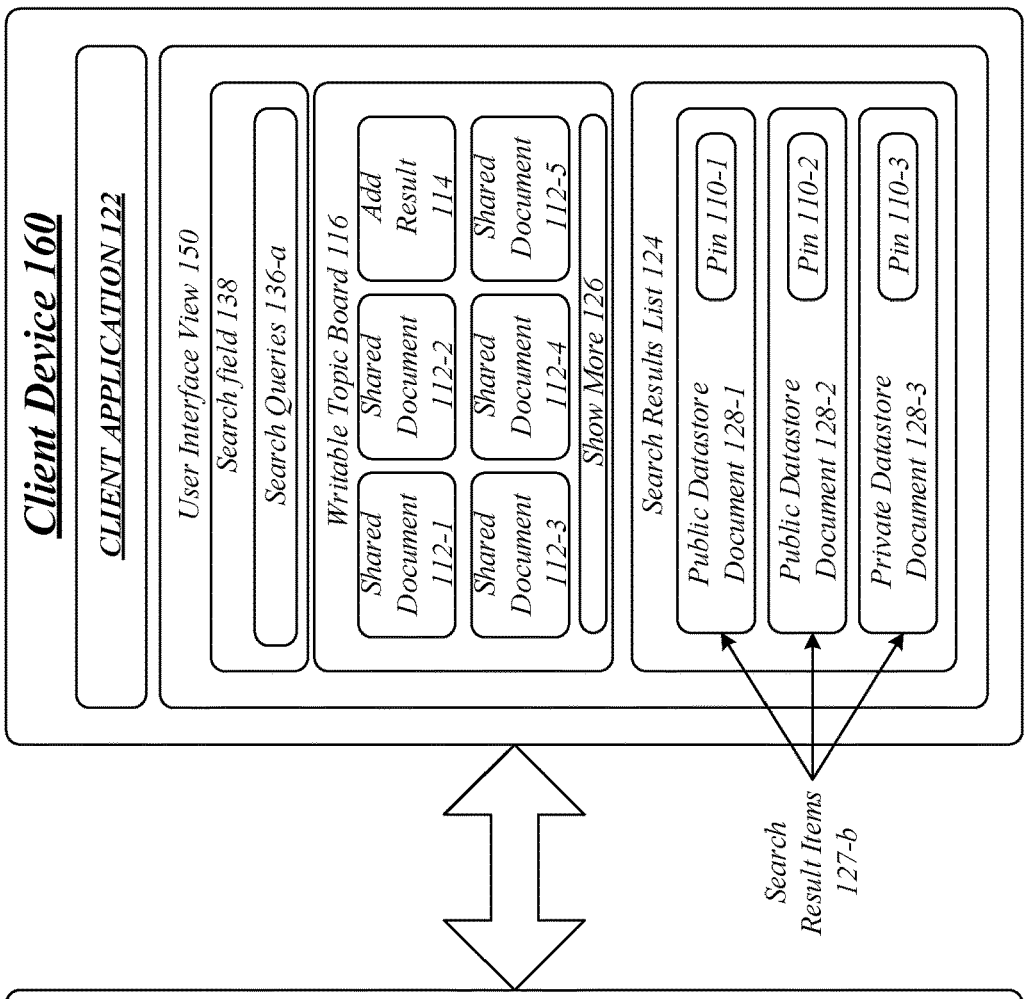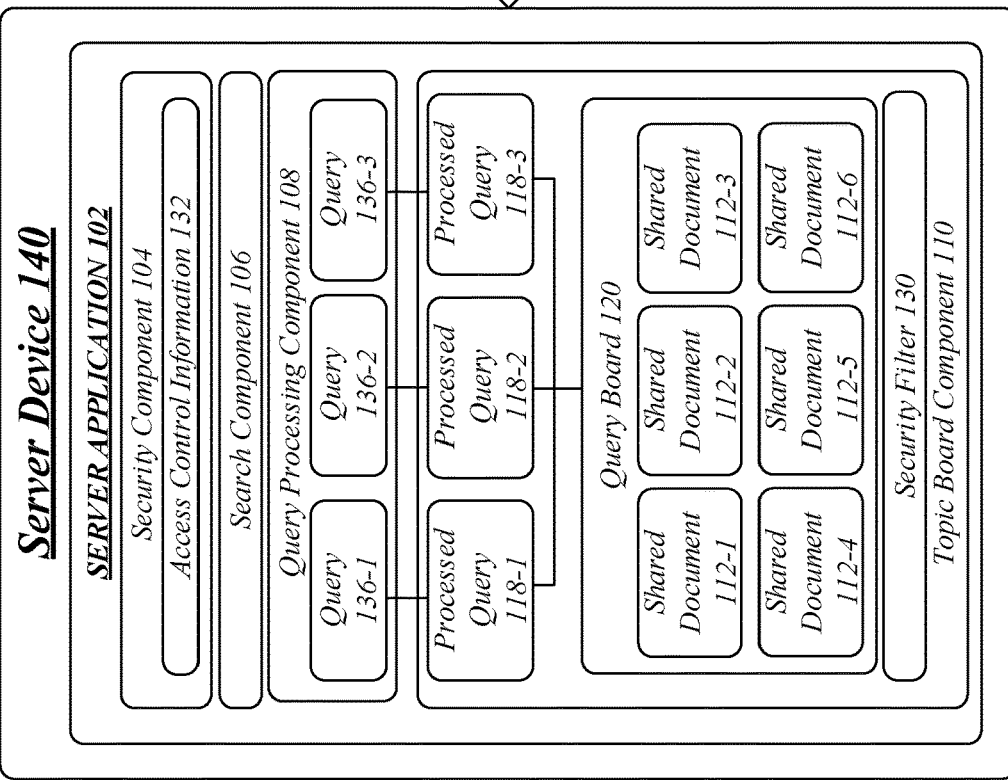
FIG. 1

600

- RECEIVE A SEARCH QUERY FROM A CLIENT APPLICATION
  602
- GENERATE A PROCESSED QUERY BASED ON THE SEARCH QUERY
  604
- PROVIDE SEARCH RESULTS TO THE SEARCH RESULT LIST FOR THE SEARCH QUERY
  606
- MAP THE SEARCH QUERY INTO A QUERY BOARD BASED ON SIMILARITY
  608
- RECEIVE A CONTROL DIRECTIVE FROM CLIENT APPLICATION TO SHARE A DOCUMENT
  610
- ADD THE DOCUMENT TO BE SHARED TO THE QUERY BOARD
  612
- PROVIDE THE SHARED DOCUMENT FROM QUERY BOARD TO THE WRITABLE TOPIC BOARD
  614

- CREATE A REMOVAL BOARD BASED ON THE SEARCH QUERY
  702

- MAP THE SEARCH QUERY TO THE REMOVAL BOARD
  704

- RECEIVE A CONTROL DIRECTIVE TO REMOVE THE SHARED DOCUMENT
  706

- ADD THE SHARED DOCUMENT TO THE REMOVAL BOARD AS A REMOVED DOCUMENT
  708

- GENERATE REMOVAL INFORMATION BASED ON THE CANONICAL REMOVAL BOARD
  710

- FILTER THE SHARED DOCUMENT TO BE PROVIDED TO THE WRITABLE TOPIC BOARD
  712

*FIG. 7*

TECHNIQUES FOR MANAGING WRITABLE SEARCH RESULTS

CROSS REFERENCE TO RELATED APPLICATION

This application is a continuation of application Ser. No. 14/083,376, filed Nov. 18, 2013, which application is incorporated herein by reference in its entirety

BACKGROUND

The proliferation of online digital information has made vast amounts of information available to users from the convenience of a computing device, such as a smartphone or tablet. It is sometimes difficult, however, for a user to find relevant information from among this vast archive of online information. To fill this need, a host of different search engines have been developed to assist a user in locating desired information. With a few keystrokes, a user can formulate a search query, and a search engine will deliver a virtually endless list of search results, rank ordered by smart algorithms designed to interpret the true intent of the search query. In many cases, however, the search results are still not meaningful. As such, improved techniques are needed to locate and deliver relevant search results in order to provide a better user experience.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to manage search results. Some embodiments are particularly directed to techniques to manage writable search results. In one embodiment, a topic board system may provide one or more writable topic boards to allow personalization of search results by users actually formulating search queries and perusing search results for relevant information. For instance, a user formulating a search query, and reviewing search result items, may identify those search result items that are particularly relevant to the search query. The identified search result items may then be delivered to another user formulating a same or similar query in subsequent searches. In this manner, the topic board system may allow users to collaborate by allowing the users to contribute and share relevant search results associated with similar search queries, thereby leading to more relevant and meaningful search results.

In one embodiment, for example, an apparatus may comprise a processor circuit and a server application for execution by the processor circuit. The server application may comprise a query processing component to receive a first search query comprising one or more search terms, a search component to provide search results for the first search query in a search result list, the search results comprising one or more search result items, and a topic board component to manage a writable topic board for the first search query, the writable topic board to comprise one or more search result items as shared documents, wherein the one or more search result items are search results from a second search query. The topic board component may also associate a first and second processed query corresponding to the first and second search queries, and map the first and second search queries to a query board. The topic board component may further receive a control directive from a first client application associated with a first user to share a document with a second client application associated with a second user. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 1 illustrates an embodiment of a topic board system.

FIG. 6 illustrates an embodiment of a logic flow for a topic board component.

FIG. 7 illustrates an embodiment of a logic flow for a removal component.

DETAILED DESCRIPTION

Figure 2:
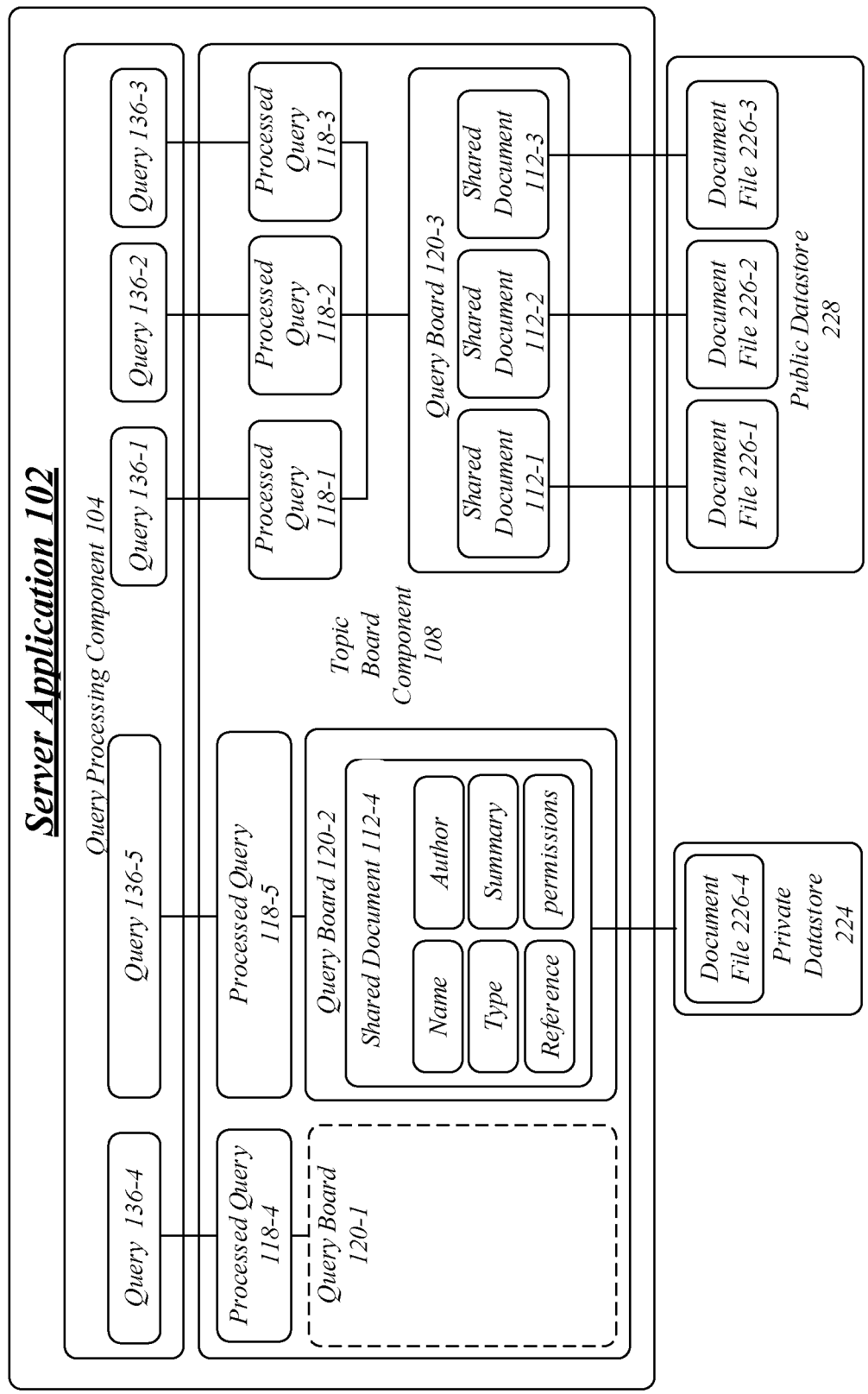
FIG. 2 illustrates an embodiment of a topic board component and a query component.

Various embodiments are directed to a topic board system arranged to allow users to create collaborative search results. A topic board system provides a collaborative space where different users can add search items from varying search results. This allows users to directly influence search results seen by other users. This collaborative space is referred to herein as a "writable topic board." A writable topic board may include a collection of search result items, such as documents, that can be modified and shared among multiple users. In this manner, users may share in more relevant and meaningful search results.

To enable users to share and collaborate on search results, a topic board system may include a server application and a client application. The server application may be generally arranged to receive search queries from the client application, and provide a list of search results as well as a writable topic board containing one or more documents shared by users to the client application. The client application may be generally arranged to present the search results and the writable topic board to a user. In this manner, the writable topic board provides a collaborative space for all users to selectively add, remove and modify search results (e.g., documents) to/from the writable topic board. In order to avoid duplicate search results, the server application may be further arranged to ensure that any document explicitly on the writable topic board does not show up as a duplicate in the regular search results list. Additionally, the server application may be arranged to map similar query boards into one query board, otherwise known as a canonical query board. For example, the server application may be arranged to map a search query for "SharePoint architecture" and a search query for "SharePoint architecture diagram" to the same canonical query board. The use of a canonical query board reduces redundancy, and expands a range of documents relevant to a particular writable topic board.

A topic board system monitors and records any user changes and feedback for a writable topic board. As such, the topic board system may be further arranged to provide personalized, social, and notification features to the users. For example, by keeping track of which users have added documents and/or which users have "liked" documents on a writable topic board, the topic board system may enable users to filter the collection of one or more documents shared by the users to only those documents added and/or liked by their peers. In an effort to prevent one or more users from spamming other users, such as by adding documents that are not relevant to the writable topic board, the topic board system may be further arranged to enable users to remove documents from their search results. For example, a separate removal board may be provided to remove a document from a given set of search results. In addition, the topic board system may be further arranged to analyze feedback associated with the documents from the users to hide and/or remove documents that users may deem irrelevant. These are merely a few of the features and benefits of a topic board system, and other features and benefits are described below.

With general reference to notations and nomenclature used herein, the detailed descriptions that follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or rearranged by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram of a topic board system 100 having a server device 140 in communication with a client device 160 via a network, peer-to-peer (P2P), or some other communications connection. The server device 140 may be arranged to execute, among other types of software, a server application 102. The client device 160 may be arranged to execute, among other types of software, a client application 122.

In various embodiments, the server application 102 and/or the client application 122 may each comprise one or more components, such as components 104, 106, 108, and 110 (as shown with server application 102). As used herein the terms "system" and "application" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment show in FIG. 1, the server application 102 and the client application 122 may be implemented by the server device 140 and the client device 160, respectively. The server device 140 and the client device 160 may be electronic devices of same or different types. An exemplary electronic device may include any electronic device capable of receiving, processing, and sending search information for the system. Examples of an electronic device may include, without limitation, an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context. Although the topic board system 100 shown in FIG. 1 has a limited number of elements in a certain topology, it may be appreciated that the topic board system 100 may include more or less elements in alternate topologies as desired for a given implementation.

The one or more components 104, 106, 108, and 110 may be communicatively coupled via various types of communications media. The one or more components 104, 106, 108, and 110 may coordinate operations between each other. The coordination may involve the uni-directional or bi-directional exchange of information. The one or more components 104, 106, 108, and 110 may communicate via one or more interfaces such as application program interfaces across one or more hardware and software boundaries. Additionally, the one or more components 104, 106, 108, and 110 may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, network interfaces, and bus interfaces.

Referring to the client device 160, the client application 122 may comprise any software application that is capable of interacting with the server application 102 of the server device 140 to facilitate search operations. In some cases, the client device 160 may not implement any of the components implemented by the server application 102. In other cases, the client application 122 may implement some or all of the components implemented by the server application 102, such as client versions of a security component 104, a search component 106, a query processing component 108, and a topic board component 110. This may be desirable when the client application 122 manages information that is local to the client device 160 or retrieved via the server device 140.

The client application 122 may generate a user interface view 150 suitable for presentation on an electronic display of the client device 160. The user interface view 150 may allow users to interact with the topic board system 100. The client application 122 may be implemented as a standalone application executing native platform specific computer program instructions on the one or more electronic devices, such as client device 160, to generate the user interface view 150. The client application 122 may also be implemented as a plugin or integrated into a standalone application which may include without limitation MICROSOFT WORD, MICROSOFT EXCEL®, MICROSOFT POWERPOINT®, MICROSOFT OUTLOOK®, MICROSOFT ACCESS®, MICROSOFT INFOPATH®, MICROSOFT ONENOTE®, MICROSOFT PROJECT, MICROSOFT PUBLISHER, MICROSOFT SHAREPOINT® WORKSPACE, MICROSOFT VISIO®, MICROSOFT OFFICE INTERCONNECT, MICROSOFT OFFICE PICTURE MANAGER, MICROSOFT SHAREPOINT DESIGNER, and MICROSOFT LYNC.

Additionally or alternatively, the client application 122 may be a standalone web application implemented in a web browser executing on the one or more electronic devices such as client device 160. The web browser may include without limitation INTERNET EXPLORER®, MOZILLA®, FIREFOX®, SAFARI®, OPERA®, NETSCAPE NAVIGATOR®, and the like. The web browser may also support computer programming languages, standards, web protocols, and/or technologies required by the client application 122. Such computer programming languages, standards, web protocols, and/or technologies may include, but are not limited to, HTML, XHTML, XML, FLASH®/ActionScript, MACROMEDIA® FLASH®, JavaScript, ECMAScript, JScript, Basic, VISUAL BASIC®, VISUAL BASIC® Scripting Edition(VB Script), CSS, Asynchronous JavaScript and XML(Ajax), FLEX®, JAVA®, Python, PERL®, C#/.net, and/or other suitable programming, scripting, or VM-based languages.

In various implementations, the web browser may generate the user interface view 150 including one or more graphical user interface (GUI) components based on data and executable computer program instructions provided by the server application 122 to the web browser. The web browser may include a language interpreter such as a script interpreter to interpret and execute the computer program instructions written in computer programming languages such as HTML, XHMTL, XML, Asynchronous JavaScript and XML (Ajax), JAVASCRIPT®, FLASH®, VBScript, and/or other scripted programming languages to generate the user interface view 150.

Additionally and alternatively, the client application 122 may also be implemented as a web application integrated into existing web services which may include without limitation MICROSOFT WINDOWS LIVE®, MICROSOFT OFFICE WEB APPLICATIONS, MICROSOFT OFFICE LIVE, MICROSOFT LIVE MEETING, MICROSOFT OFFICE PRODUCT WEB SITE, MICROSOFT UPDATE SERVER, MICROSOFT SHAREPOINT SEARCH DRIVEN PUBLISHING, and MICROSOFT OFFICE 365.

In various embodiments, each client application 122 may also include or be associated with account information including a user identifier that identifies a user accessing the client application 122 and may be provided by the user before or while using the client application 122. Exemplary user identifiers may include without limitation real names, user selected login name, or email address. Alternatively the user identifiers may include a system generated user identifier such as a global unique identifier (GUID), or any other digital representation sufficient to uniquely identify or distinguish a user.

In various embodiments, the account information may further include or be associated with organizational information to identify each user's membership to an organization and one or more entities within that organization. The organizational information may include without limitation corporate information (e.g., the corporation the user is an employee of), division information (.e.g., the division within the corporation the user is part of), department information (the department within the division the user is part of), group information (the group within the department the user is part of) and/or any other logical delineations for an organization. Thus, it may be appreciated that references made to users within the same scope may include users that are within the same company, or same division, or same department, and/or same group.

In various embodiments, some users of the client application 122 may include moderators, administrators or other users with elevated privileges to administer, manage, and/or moderate one or more functionalities provided by the client application 122 and/or server application 102. Just like users, the moderators or others with elevated privileges may be organized into company, division, department, and/or group. Additionally, in some implementations, moderators may be associated with an entire company, division, department, and/or group such that company moderators may have highest privilege, followed by division moderators, department moderators, and group moderators. For example, a company moderator may override any modifications made by division moderators, department moderators, and group moderators.

In various embodiments, the account information may further include or be associated with peer information which may contain lists of user identifiers that one or more components of the server application 102 has identified to be socially closest to the user based at least partially on, for example, the organizational information, electronic communications information (e.g., email and/or instant messaging between users), and/or other information that may be utilized by the one or more components of the server application 102 to identify the socially closest user.

Regardless of the underlying implementation, the user interface view 150 may comprise, among other GUI components, a search field 138, a writable topic board 116, and a search results list 124. Users may input one or more search queries 136-$a$ into the search field 138. The search queries 136 are designed to obtain search results containing one or more search result items 127-$b$ contained in the search results list 124. The search result items 127 may include various documents 128-$c$, such as public datastore documents and/or private datastore documents. Each search result item 127 may be associated with document identifiers provided by the search component 106 of the server application 102. The writable topic board 116 may include one or more shared documents 112-$d$ stored in one or more query boards 120-$e$ of the server application 102 and may implemented for example as a web page comprising one or more tiles representing each shared document 112. Additionally or alternatively, the writable topic board 116 may also be implemented a wiki-page, or as a MICROSOFT WORD, MICROSOFT POWERPOINT®, MICROSOFT ONENOTE® and the like, in order to allow for richer content to be displayed within the writable topic board 116. Regardless of the implementation, the writable topic board 116 may be a collaborative space that enables users to add their own search result items associated with a given search query 136 to the writable topic board 116.

It is worthy to note that "a" and "b" and "c" and similar designators as used herein are intended to be variables representing any positive integer. Thus, for example, if an implementation sets a value for a=5, then a complete set of search queries 136-$a$ may include search queries 136-1, 136-2, 136-3, 136-4 and 136-5. The embodiments are not limited in this context.

The user interface view 150 may include a search field 138 arranged to receive user input of a search query 136 via an input device such as a keyboard device, a touchscreen device, a stylus or mouse, voice commands, gestures, and so forth. A search query 136 may comprise one or more search terms utilized by the server application 102 to search for electronic items (e.g., web pages, files, documents, etc.) related to the search terms stored in a public network (e.g., the Internet) or a private network (e.g., an intranet). It may be appreciated that in some implementations, a search field 138 may not be included or necessary, such as, for example, in a search driven publishing (e.g., content search web part (CSWP)) web page where search queries 136 are automatically embedded in the web page and transmitted to the server application 102 when the web page is viewed or loaded.

To further refine the search results, the one or more search terms may comprise various search directives such as, for example, Boolean operators (e.g., AND, OR, and NOT), proximity operators (e.g., near or ordered near), and/or quotes. The client application 122 may transmit the search query 136 as one or more messages or signals to the server application 102 via a network or P2P connection (e.g., wired or wireless).

The user interface view 150 may include a search results list 124 arranged to display search results comprising various search result items 127 provided by the server application 102 in response to a search query 136. As shown in FIG. 1, for instance, the search result items 127 may include public datastore documents 128-1, 128-2, and a private datastore document 128-3, each located in a variety of content sources. For example, the public datastore documents 128-1, 128-2 may be stored in a public datastore, and the private datastore document 128-3 may be stored in a private datastore.

Each search result item 127 may also include a GUI widget pin 110-$f$ arranged to pin that search result item 127 to the writable topic board 116 for sharing between users. For example, public datastore documents 128-1, 128-2, and private datastore document 128-3, may include GUI widget pins 110-1, pin 110-2, and pin 110-3, respectively. By way of example, a user may use a pointing device or a gesture to select the GUI widget pin 110-1 to add the public datastore document 128-1 to the writable topic board 116 for sharing with other users.

The user interface view 150 may further support drag and drop operations from the pointing device to drag a search result item 127 displayed in the search results list 124 to the writable topic board 116. In response to the user inputs, the client application 122 may generate control directives as one or more messages or signals and communicate or transmit the generated control directives to the server application 102. The client application 122 may then update the user interface view 150 in accordance with the response received from the server application 102.

The user interface view 150 may include a writable topic board 116. The writable topic board 116 may include one or more shared documents 112-$g$, such as exemplary shared documents 112-1, 112-2, 112-3, 112-4, and 112-5 contained in a query board 120 of the server application 102 and a writable topic board 116 of the client application 122. In one embodiment, the shared documents 112 may be various search result items 127 previously pinned to the writable topic board from previous search queries 136 made by a set of users. The writable topic board 116 may also be arranged to receive user input via an input device such as a pointing device, gesture, voice command, or other suitable modality. For example, a user may use a pointing device or gesture to select a shared document 112 to view or access the document file associated with the shared document 112.

The writable topic board 116 may include an add result tile 114 to enable a user to add other documents that may or may not be otherwise available in the search result list 124 to the writable topic board 116. For example, the user may add other documents, such as from client device 160 or a network storage location, to the writable topic board 116 for sharing with other users by using an input device such as a pointing device or gesture to select the add result tile 114.

The user interface view 150 may also include a GUI widget show more 126 to display additional shared documents 112 associated with the search query 136 that may not be initially visible due to limited display area. For example, the user may use the pointing device or gesture to select GUI widget show more 126 to display additional shared documents 112 in the writable topic board 116 not currently presented on a display. In response to the user inputs, the client application 122 may generate control directives as one or more messages or signals and communicate or transmit the generated control directives to the server application 102. The client application 122 may also update the user interface view 150 in accordance with the response received from the server application 102.

Referring to the server device 140, the server application 102, may comprise among other elements, a security component 104, a search component 106, a query processing component 108, and a topic board component 110. The server application 102 may further include other components as described in more detail with reference to FIGS. 2-5.

The query processing component 108 may be generally arranged to manage search queries 136 received from users via the client application 122. In one embodiment, the query processing component 108 may be arranged to receive, analyze, and process search queries 136 comprising one or more search terms, and generate processed queries 118-$h$. In some cases, the query processing component 108 may also be arranged to perform search query analysis, such as query expansion, to increase the number of relevant search results. Examples of query expansion may include without limitation a variety of algorithms, such as one or more spelling correction algorithms, synonym expansion algorithms, stemming algorithms, and other query refining algorithms.

One example of a query expansion may include spelling correction algorithms. A spelling correction algorithm may be designed to automatically correct any misspelled search terms and generate a spell corrected search query.

Another example of query expansion may also include synonym expansion algorithms programmed to expand the search terms in the spell corrected search query. The synonym expansion algorithm may then generate a synonym expanded search query based on, for example, one or more synonym look up tables.

Yet another example of query expansion may also include stemming algorithms. A stemming algorithm may be programmed to identify stems of the terms contained in the synonym expanded search query and generate the processed search queries including the search query stems based on, for example, truncation and/or suffix removal. It may be appreciated that the use of certain operators such as, for example, quotes around a search term may limit the use one or more expansion algorithms, such as spelling correction algorithms, synonym expansion algorithms, and/or stemming algorithms in order to provide more accurate search results.

An example of search query analysis, such as query expansion, may be as follows. Assume a search query 136 contains the search terms "ncie cats." The query processing component 108 may process the search terms "ncie cats" to generate a spell corrected search query comprising the search terms "nice cats." Additionally, the query processing component 108 may perform synonym expansion on the spell corrected search query and generate a synonym expanded search query comprising terms "friendly," "pretty," "nice" and "feline," "kitten," "cats." The query processing component 108 may further identify the stems of the synonym expanded search query and generate a processed query comprising one or more search term stems. Thus, with respect to the initial search query 136 of "ncie cats," the one or more search term stems, such as "friend," "nice," "pretti" and "felin," "kitten," "cat," so that documents comprising the terms "prettiest feline," "nicest kitten" or "pretty cat," may be also be identified as relevant to the user's search even though these terms do not exactly match the original search query 136 search terms of "ncie cats."

The topic board component 110 may be generally arranged to manage various writable topic boards 116-$i$ associated with the search queries 136. In one embodiment, the topic board component 110 may be arranged to manage a writable topic board 116 by providing shared documents 112 for access by users, receive control directives to add one or more shared documents 112, create one or more query boards 120-$j$ in response to received search queries 136, associate the received search queries 136 with the one or more query boards 120, map one or more search queries 136 into a corresponding query board 120, add one or more shared documents 112 to one or more query boards 120 for sharing, filter the shared documents 112 that are to be provided for sharing, and other management operations.

In one embodiment, the topic board component 110 may be arranged to map similar search queries 136 to a same query board 120. Further, the topic board component 110 may be arranged to identify a previously received search query 136 that has a close similarity with the currently received search query 136. The topic board component 110 may calculate similarity scores based on existing processed queries 118 associated with query boards 120, and a processed query 118 associated with the recently received search query 136. The topic board component 110 may rank the calculated similarity scores to identify an existing processed query 118 that is closest in similarity with the recently processed query 118 associated with the recently received search query 136. Additionally, the calculated similarity score may need to meet or exceed a threshold value before a given search query 136 may be determined to be similar with a previously received search query 136.

Assuming that the calculated similarity score meets or exceeds the threshold value, the topic board component 110 may map the received search query 136 to an existing query board 120 identified to be the closest in similarity with the received search query 136 by associating the processed query 118 of the received search query 136 with the existing query board 120. After an existing query board 120 has been identified, the topic board component 110 may be further arranged to provide the one or more shared documents 112 contained in the existing query board 120 to the writable topic board 116.

By way of example, assume the topic board component 110 comprises a query board 120 associated with processed queries 118-1, 118-2. The processed queries 118-1, 118-2 correspond to search queries 136-1, 136-2, respectively. The topic board component 110 may receive a processed query 118-3 from search component 106, which corresponds to search query 136-3. The topic board component 110 may calculate a similarity score between the search query 136-3 and the search query 136-1 and/or the search query 136-2 based on the processed search queries 118-3, 118-1, and 118-2. Based on the calculated similarity score, the topic board component 110 may identify processed queries 118-1, 118-3 as having a closest similarity. Because a closest search query has been identified with an existing search query 136-1 which is associated with query board 120, the topic board component 110 may map the search query 136-3 by associating processed query 118-3 with query board 120 and provide the shared documents 112-1, 112-2, 112-3, 112-4, 112-5, and 112-6 contained in the query board 120 to the writable topic board 116.

In instances where a similar query board 120 cannot be identified by the topic board component 110 for a received search query 136, the topic board component 110 may be arranged to create a new query board 120 based on the received search query 136.

The topic board component 110 may also be arranged to map the newly created query board 120 with the received search query 136 by associating the processed query 118-3 with the newly created query board 120.

However, it may be appreciated that not all query boards are saved. Furthermore, when users do not make any changes to the query board 120, such as, for example, when no documents are added to the writable topic board 116, the topic board component 110 may be arranged to not save the query board 120. Accordingly, in some given implementations, the topic board component 110 may be arranged to create a query board 120, in response to a control directive from the client application 122 to share one or more documents 112 so that the query board 120 is created only when changes are made to the query board 120.

In one embodiment, the topic board component 110 may further comprise a security filter 130 to filter or remove certain shared documents 112 from a writable topic 116 based on access control information 132 generated by security component 104. The security filter 130 may be arranged to filter or remove shared documents 112 from a writable topic board on a per search basis. In this manner, contents of a given writable topic board 116 as viewed by a given user may vary according to a set of security permissions given to a user, application, device or system.

In instances where logical tenant isolation may be required, the topic board component 110, server application 102, and/or server device 140 may be configured to manage multiple companies, divisions, departments, and/or groups and as such, what may be relevant to one company, division, department, and/or group may not be relevant to another. Accordingly, some logical tenant isolation may be required between query boards 120 of different organizations and/or different entities within an organization. In those embodiments, the topic board component 110 may logically delineate the query boards 120 based at least partially on organizational information associated with each user's account information, so that writable topic boards 116 are shared among users within the same organization and/or same entity within the organization.

In one embodiment, the topic board component 110 may further include one or more organizational containers where each organizational container may be associated with an organization. Furthermore, depending upon the granularity required, the organizational containers may further include one or more organizational entity containers to further delineate query board 120 based on one or more entities within an organization. Thus, in one embodiment, the topic board component 110 may create, identify, and/or map query boards 120 within the organization and/or entity within that organization the user is a member of, based at least partially on the organizational information associated with or included in the user's account information.

By way of example, a first user of client application 122 may have an associated account information which may include or be associated with organizational information indicating that he/she is a member of Division A of company A. In response to receiving a first search query 136 and a control directive to share a document from the client application 122 for the first user, the topic board component 110 may create a new query board 120, map the first search query 136 to the new query board 120, and store or associate the new query board 120 in an organizational entity container associated with Division A where the organizational entity container is further contained or associated with an organizational container for company A.

Continuing with the above example, a second user of client application 122 may also have an associated account information which may include or be associated with organizational information indicating that he/she is also a member of Division A of company A. In response to receiving a second search query 136 from client application 122 for the second user, the topic board component 110 may identify an existing query board 120 in the organizational entity container associated with Division A of the organizational container for company A, map the second search query 136 to the existing query board 120 and provide one or more shared documents 112 within the existing query board 120 to the client application 122 for the second user.

The security component 104 may be generally arranged to manage access control information 132 which may be used to filter the one or more shared documents 112 provided to the writable topic boards 116. In one embodiment, the security component 104 may be arranged to generate access control information 132 based on the shared documents contained in the topic board component 110 and account information associated with the client application 122. The generated access control information 132 may contain a list of shared documents 112 to be removed by the writable topic board component 110 because they are inaccessible to the client application 122 having the associated account information. Thus, shared documents 112 that are not accessible to the user based on the user's account information will not be provided to the client application 122 and will not be displayed or accessible to the user in the writable topic board 116.

The search component 106 may be generally arranged to manage search results provided to the users based at least partially on the received search queries 136. In one embodiment, the search component 106 may be arranged to provide search results to the client application 122 based at least partially on the processed queries 118 associated with search queries 136 and an index file. The search component 106 may be arranged to crawl one or more content sources, process the crawled content, and generate the index file based on the processed content. The one or more content sources may include, without limitation, external web sites, file shares, user profiles, content management platforms (e.g., IBM® NOTES, EMC® DOCUMENTUM) and the like. The index file may include one or more entries of crawled content, and each entry may comprise a document identifier and document metadata associated with a document file stored in private or remote datastores. Exemplary document metadata may include, without limitation, document name, document summary, document type, document author, document reference, document permissions and the like.

It may also be appreciated that while the search component 106 may generally be configured to manage search results, the search component 106 may also be configured to perform at least some of the functionality of the security component 104. Thus, in some implementations, in addition to managing search results, search component 106 may also be generally arranged to manage access control information 132 which may be used to filter the one or more shared documents 112 provided to the writable topic boards 116 and generate access control information 132.

Furthermore, in some implementations, the search component 106 may also be configured to provide content from external content sources such as, for example, one or more search result items from various search engines or web pages (e.g., GOOGLE® SEARCH ENGINE, BING® SEARCH ENGINE, YAHOO® SEARCH ENGINE, WIKIPEDIA®), the user profile datastore, and/or active directory datastore associated with a user to the topic board component 110, so that the topic board component 110 may automatically pre-populate a newly created empty query board 120 with relevant content as one or more shared documents 112. It may be appreciated that although the topic board component 110 may add one or more relevant content as shared documents 112 to a newly created query board 120, the topic board component 110 may still not save the newly created query board 120 unless a user adds one or more shared documents 112 to the newly created query board 120.

However, in order to prevent users from viewing duplicate documents in the user interface view 150, the search component 106 may filter or remove any search result items 127 that are already provided to the writable topic board 116 such that the search result items 127 in the search results list 124 are mutually exclusive with the shared documents 112 contained in the writable topic board 116.

FIG. 2 illustrates a more detailed block diagram of the query processing component 108 and the topic board component 110. The query processing component 108 may receive various search queries 136 such as search queries 136-1, 136-2, 136-3, 136-4, and 136-5 shown in FIG. 2. Each search query 136-1 . . . 136-5 may be mapped to a query board such as query board 120-1, 120-2 and 120-3. Each query board 120 may also include, or be associated with, one or more shared documents 112 such as shared documents 112-1, 112-2, 112-3, and 112-4 shown in FIG. 2. Each shared document 112 may be further associated with document files 226-$k$, such as document files 226-1, 226-2, 226-3 and 226-4, which may be stored in a private datastore and/or public datastore, such as a private datastore 224 and a public datastore 228.

In one embodiment, a document file 226-$l$ may be stored in the private datastore 224, where the document file 226 may only be accessible to one or more users with proper permissions associated with each user's account information. Alternatively, a document file 226 may be stored in the public datastore 228, where access to the document file 226 is unrestricted. It is worthy to note, however, that in some cases the public datastore 228 may need a general user account (e.g., to a mass storage provider) in order to access the document file 226.

In one embodiment, the private datastore 224 and/or the public datastore 228 may be implemented within a same electronic device implementing server application 102. For example, a computing device may implement the server application 102 including the shared document 112-4 having an associated document file 226-4 stored on a mass storage device of the computing device.

In one embodiment, the private datastore 224 and/or the public datastore 228 may be implemented by a different electronic device as the one implementing the server application 102. For example, a computing device may implement the server application 102 including the shared document 112-4 having an associated document file 226-4 stored on a mass storage device of a server device.

Exemplary private datastore 224 and public datastore 228 may include without limitation, MICROSOFT SKYDRIVE®, APPLE® ICLOUD®, GOOGLE® DRIVE, AMAZON® CLOUD DRIVE, and the like. In addition to cloud based mass storage, private datastore 224 and public datastore 228 may include document files stored on mass storage device and network storage devices coupled to the server application 102 such as, for example, storage area network (SAN) or network attached storage (NAS). It may be appreciated that these are merely a few examples of private datastore 224 and public datastore 228, and embodiments are not limited to these examples.

In one embodiment, the topic board component 110 may comprise one or more query boards 120, such as query boards 120-1, 120-2, and 120-3. Each query board 120 may be associated with the one or more processed queries 118, generated by the query processing component 108. Furthermore, as new query boards 120 are created, the topic board component 110 may map a search query 136 with the newly created query board 120 by associating the newly created query board 120 with the processed query 118 generated from the search query 136. Based on the similarities between new search queries 136 and existing search queries 136, the topic board component 110 may map the new search queries 136 with existing topic boards 120.

In one embodiment, a query board 120 may be arranged to store one or more shared documents 112. In the example provided in FIG. 2, an exemplary query board 120-3 may store three shared documents 112-1, 112-2 and 112-3, while query board 120-2 may store only a single shared document 112-4. Each shared document 112 may include or be associated with metadata describing one or more attributes for a corresponding document file. For example, shared document 112-4 may be associated with document file 226-4 stored in a private datastore 224. The metadata describing the one or more attributes of document file 226-4 may include without limitation such metadata as document name, document author, document summary, document reference, document type, and document permissions.

The document reference may be utilized in various embodiments to identify a document that is being added to a query board, removed from a query board, added to the removal board, removed from the removal board, or has received feedback information. The document reference may further include a document location and a document identifier of the document file 226. For instance, in response to receiving a control directive from the client application 122 requesting access to shared document 112-4 by a user, the server application 102 may identify document file 226-4 based on the document reference contained in or associated with the shared document 112-4, and provide the document file 226-4 to the client application 122 for access by the user. Examples of a document reference may include, without limitation, a universal resource identifier (URI), a universal resource locator (URL), a file path and so forth.

Examples of document type for a document file such as document file 226 may include, without limitation, application file types, such as a word processing file type, a spreadsheet file type, a presentation file type, a personal information manager (PIM) file type, a database file type, a publisher file type, a drawing file type, a note file type, a message file type, and so forth. Further examples for a document file 226 may include multimedia file types, such as an audio file type, an image file type, a video file type, an AV file type, an animation file type, a game file type, a markup file type, a web page type, and so forth. Embodiments are not limited in this context.

Examples of document permissions for a document file 226 may include, without limitation, access control lists including one or more access control entries, and each access control entry may include one or more user identifiers and each user identifier may be associated with access permissions including read, write, delete and/or execute permissions. It may be appreciated that these are merely a few examples of document references, document types, and document permissions, and embodiments are not limited to these examples.

In one embodiment, the server application 102 may provide a document file 226 to the client application 122 by identifying an appropriate transfer protocol with the client application 122 and transferring the document file 226 to the client application 102 based on the identified transfer protocol. Exemplary transfer protocols may include, without limitation, file transfer protocol (FTP), SSH file transfer protocol (SFTP), hypertext transfer protocol (HTTP), hypertext transfer protocol secure (HTTPS), and the like. Alternatively, the server application 102 may interface with the client application 122 via one or more inter-process communication mechanisms such as network sockets in order to provide the document file 226 the client application 122. It may be appreciated that these are merely a few examples of providing document files for access by the user, and embodiments are not limited to these examples.

In another embodiment, the server application 102 may also provide a document file 226 shared as a shared document 112 with collaborative document management, such that two or more users may simultaneously create and/or modify the document file 226 in substantially real time. Moreover as one or more users access one or more shared documents 112 in the topic board component 110 from client applications 122, any edits or updates made by one user for the document file 226 may be received by the server application 102 and transmitted to another client application 122 for a different user accessing the same document file 226. The server application 102 may be further configured to provide conflict resolution so that any edits and/or updates made by one or more users to the document file 226 may be seamlessly merged.

The document files 226 may comprise any digital information element or digital content generated by a software program, such as an application program, a web application, a web service, a client application, a server application, a system program, and so forth. Different software programs may generate different types of digital content As such, digital content generated by different software programs may comprise heterogeneous digital content.

Examples for document files 226 may include without limitation application files, such as a word processing file, a spreadsheet file, a presentation file, PIM file, a database file, a publisher file, a drawing file, a note file, a message file, a project file, and so forth. Further examples for document files 226 may include multimedia files, such as an audio file, an image tile, a video tile, an audio/video (AV) file, an animation file, a game file, a markup file, a web page file, a social networking service (SNS) file, and so forth, It may be appreciated that these are merely a few examples of document files 226, and embodiments are not limited to these examples.

In one embodiment, the one or more document files 226 may comprise files for a productivity suite of inter-related client applications, server applications and web services, designed for a particular operating system, such as a MICROSOFT® OFFICE productivity suite for MICROSOFT WINDOWS®, made by Microsoft Corporation, Redmond, Wash.

Examples for inter-related client applications may include without limitation MICROSOFT WORD, MICROSOFT EXCEL®, MICROSOFT POWERPOINT®, MICROSOFT OUTLOOK®, MICROSOFT ACCESS®, MICROSOFT INFOPATH®, MICROSOFT ONENOTE®, MICROSOFT PROJECT, MICROSOFT PUBLISHER, MICROSOFT SHAREPOINT® WORKSPACE, MICROSOFT VISIO®, MICROSOFT OFFICE INTERCONNECT, MICROSOFT OFFICE PICTURE MANAGER, MICROSOFT SHAREPOINT DESIGNER, and MICROSOFT LYNC.

Examples for inter-related server applications may include without limitation MICROSOFT SHAREPOINT SERVER, MICROSOFT LYNC SERVER, MICROSOFT OFFICE FORMS SERVER, MICROSOFT OFFICE GROOVE® SERVER, MICROSOFT OFFICE PROJECT SERVER, MICROSOFT OFFICE PROJECT PORTFOLIO SERVER, and MICROSOFT OFFICE PERFORMANCEPOINT® SERVER.

Examples for inter-related web services may include without limitation MICROSOFT WINDOWS LIVE®, MICROSOFT OFFICE WEB APPLICATIONS, MICROSOFT OFFICE LIVE, MICROSOFT LIVE MEETING, MICROSOFT OFFICE PRODUCT WEB SITE, MICROSOFT UPDATE SERVER, and MICROSOFT OFFICE 365. The embodiments are not limited to these examples.

In one embodiment, the query processing component 108 may receive a search query 136-4 comprising one or more search terms. Query processing component 108 may generate processed query 118-4. Based on the processed query 118-4, the topic board component 110 may attempt to identify a similar existing search query 136 mapped to an existing query board 120. In this example, assume the topic board component 110 did not identify an existing similar search query. The topic board component 110 may avoid initially creating a query board 120-1 until changes are made by a user, such as when a control directive is received from the client application 122 to explicitly add a document to the query board 120-1. Thus, when users do not make any changes to a query board 120, such as, for example, when no documents are added to the query board 120-1, the topic board component 110 may be arranged to not create and/or save the query board 120-1.

In one embodiment, the topic board component 110 may receive a control directive from the client application 122 to add documents to the query board 120-2. The topic board component 110 may create the query board 120-2, map the search query to the query board 120-2 by associating the processed query 118-5 with the newly created query board 120-2, and add the document as a shared document 112-4 to the newly created query board 120-2. Additionally, the topic board component 110 may also retrieve the document metadata associated with the document file 226-4 from the search component 106 or from the document file received from the client application 122. The topic board component 110 may process the document metadata associated with the document file 226-4, and store or associate the processed document metadata with shared document 112-4. The topic board component 112-4 may also associate the document file 226-4 stored in the private datastore 224 with the shared document 112-4.

In one embodiment, the query processing component 108 may include previously received search queries 136-1, 136-2. The query processing component 108 may also have previously generated processed queries 118-1, 118-2. The topic board component 110 may have previously associated the processed queries 118-1, 118-2 with query board 120-3 and added shared documents 112-1, 112-2, and 112-3 to the query board 120-3. The topic board component 110 may also previously associated the share documents 112-1, 112-2, and 112-3 with document file 226-1, 226-2, and 226-3 stored in the public datastore 228.

In one embodiment, the query processing component 108 may receive a new search query 136-3 comprising one or more search terms and generate processed query 118-3. The topic board component 110 may map search query 136-3 to query board 120-3 based on a similarity of search query 136-3 to search queries 136-1, 136-2. The topic board component 110 may identify the search query 136-1 and/or search query 136-2 as being similar to search query 136-3 based on calculated similarity scores. The topic board component 110 may map the search query 136-3 with the query board 120-3 by associating the processed query 118-3 with the query board 120-3. In response to receiving the new search query 136-3, the topic board component 110 may further provide the shared documents 112-1, 112-2, and 112-3 contained in the query board 120 to the writable topic board 116 for client application 122.

In addition to automatic mapping of search queries 136 to query boards 120 and creation of new query boards 120 by the topic board component 110, it may be appreciated that creation and mapping of query boards 120 may also be performed manually by moderators of one or more query boards 120. Moreover, a user may be (automatically) designated a moderator of a query board 120 when the document permissions for all shared documents 112 within that query board 120 indicate that the user has total ownership and/or control over all shared documents 112 in that query board 120. Additionally or alternatively, a moderator may specifically assigned to moderate, administrate, and/or manage a set of query boards 120 within an organization and/or organizational entity. Thus in one embodiment, the client application 122 may further present a management user interface (not shown) configured to display query boards 120 at a selected scope (e.g., company, division, department, and/or group), enable a moderator to view query boards 120 at the selected scope, browse the query boards 120 and add new search queries 136, create new query boards 120, remove query boards 120, merge query boards 120, add/remove shared documents 112, and/or map new or existing search queries 136 to new or existing query boards 120. This would, for example, enable a moderator of an organization to quickly provide a set of topic boards 120 comprising commonly used shared documents 112 and each associated with commonly used search queries 136, so that users can quickly locate the documents they are searching for.

Figure 3A:
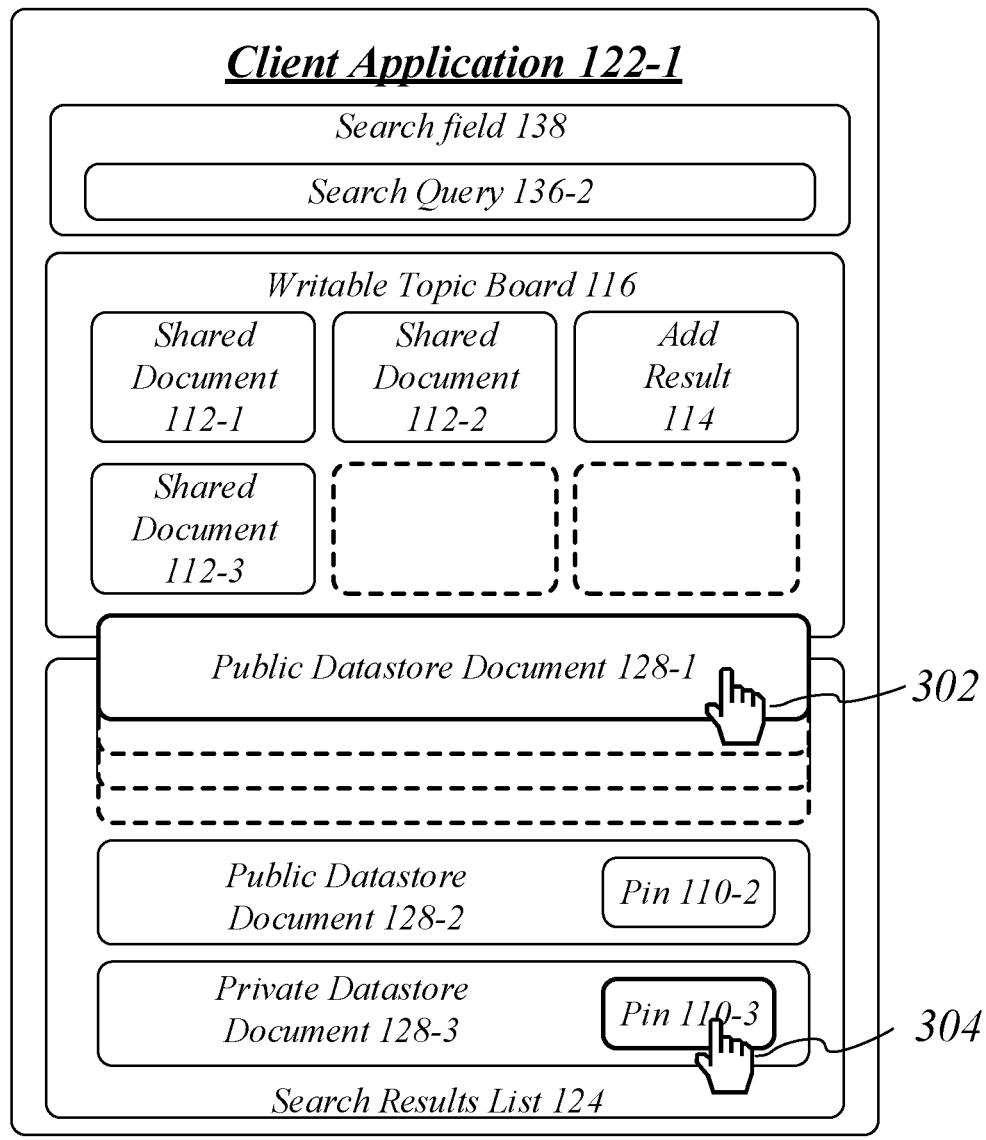
FIG. 3A illustrates an embodiment of user interface view of a topic board system for sharing documents.

FIG. 3A illustrates an embodiment of a user interface view 300 generated by the client application 122-1 based at least partially on the shared documents 112 and security trimmed search results provided by the topic board component 110 and search component 106, respectively. The user interface view 300 of the client application 122-1 may include a search field 138 for the input of search query 136-2 comprising one or more search terms.

The user interface view 300 may also include a search results list 124. The search results list 124 may include public datastore documents 128-1, 128-2, and private datastore document 128-3, as one or more search result items 127 associated with the search query 136-2. Each search result item 127 contained in the search result list 124 may include the document name, document summary, document type, document author, document reference, and/or document permissions associated with the public datastore documents 128-1, 128-2, and private datastore document 128-3. Additionally, search result items 127 such as public datastore document 128-2 and private datastore document 128-3 may include GUI widgets such as pin 110-2 and pin 110-3, respectively, to pin the corresponding documents to the writable topic board 116 for sharing between users.

The user interface view 300 may further include the writable topic board 116 managed by the topic board component 110. The writable topic board 116 may include shared documents 112-1, 112-2, and 112-3 contained in the query board 120-3, where a previous search query 136-1 has been previously mapped to the query board 120-3.

In the user interface view 300, each of the shared documents 112-1, 112-2, and 112-3 may be displayed as a tile in the writable topic board 116. Each tile may further include the document name, document summary, document type, document author, document reference, and/or document permissions associated with the public datastore documents 128-1, 128-2, and private datastore document 128-3.

With respect to sharing documents between users, the user interface view 300 may accept a variety of user inputs such as user input via an input device such as a pointing device or gesture on a touch screen. For example, a user of client application 122-1 may use drag and drop operations with respect to public datastore document 128-1 in order to share the public datastore document 128-1. In response to the user input via gesture 302, the client application 122 may generate control directives to share public datastore document 128-1 and communicate or transmit the generated control directives to the server application 102.

To share public datastore document 128-1, the user of client application 122-1 may use gesture 302 to drag and drop the public datastore document 128-1 onto the writable topic board 116. To share private datastore document 128-3, the user of client application 122-1 may use gesture 304 to select the GUI widget pin 110-3 to pin the private datastore document 128-3 to the writable topic board 116. To share a document not contained in the search results list 124, the user interface view 300 may further include an add result 114 tile to enable users to add other documents not listed in the search result list 124. For instance, the user may use the pointing device or gestures to select add result 114, which surfaces a file selector (e.g., an open file dialog box). The user may utilize the file selector to browse and select one or more document files stored in private and/or public datastores which may be located in the client device 160 or in a network storage location appropriate for sharing between users.

Figure 3B:
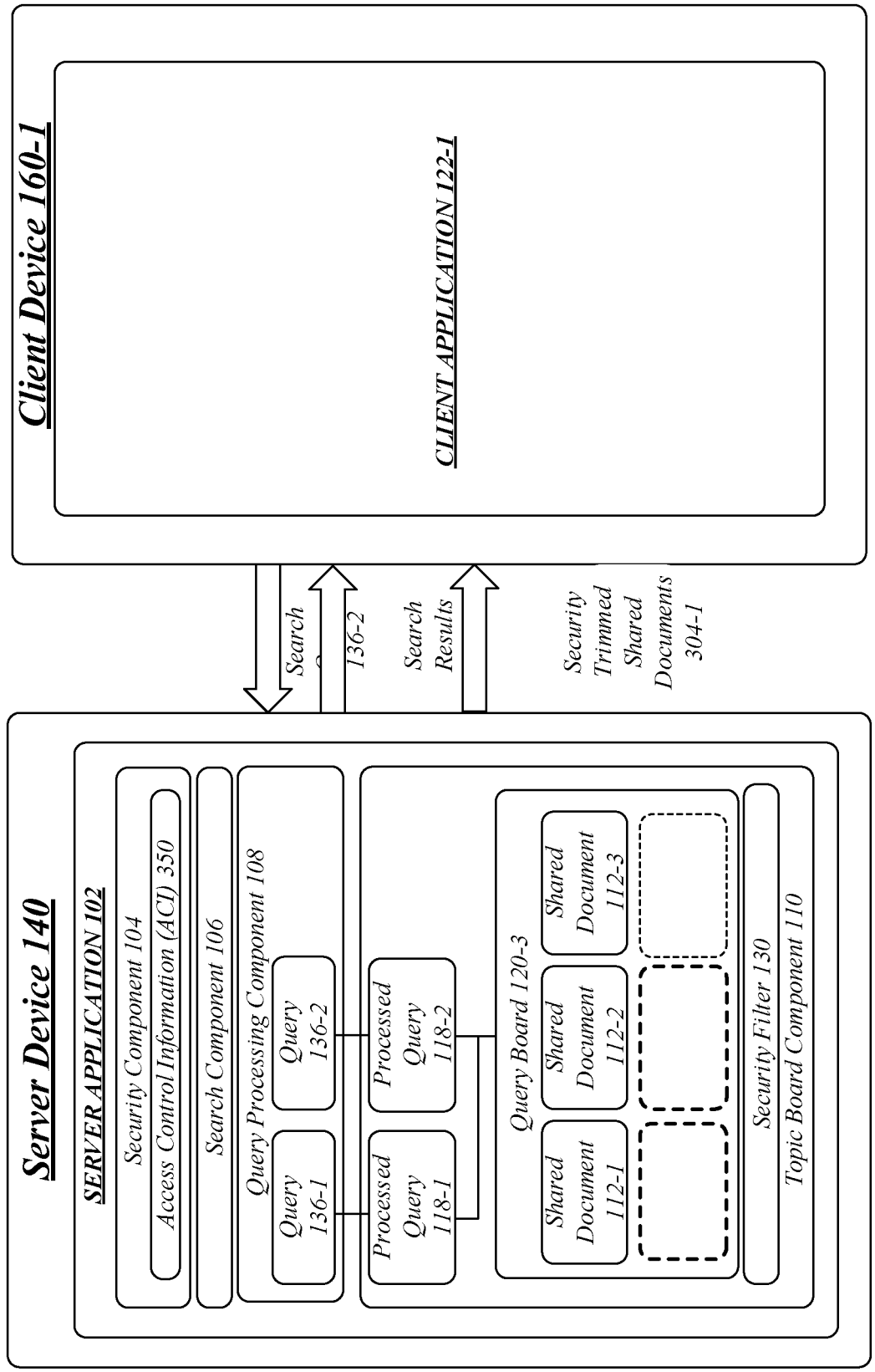
FIG. 3B illustrates an embodiment of a topic board system receiving a search query.

FIG. 3B illustrates an embodiment of the topic board system 100 with respect to user interface view 300 where the server application 102 receives search query 136-2 from client application 122-1.

In the topic board system 100 shown in FIG. 3B, the query processing component 108 may initially include a search query 136-1 previously received at time $t_1$ and generated a processed query 118-1, where the processed query 118-1 is associated with the search query 136-1. Additionally, the search query 136-1 has also been previously mapped to query board 120-3.

The query processing component 108 may receive a search query 136-2 at time $t_2$ and generate a processed query 118-2, where the processed query 118-2 is associated with the search query 136-2. The search component 106 may receive the generated processed query 118-2 and generate search results to be provided to the client application 122-1.

The topic board component 110 may identify an existing or previous search query similar to search query 136-2 and map the search query 136-2 to query board 120-3 based on similarity between search query 136-2 with respect to an existing or previously received search query. For example, the topic board component 110 may identify search query 136-1 as being similar to search query 136-2 and may map the search query 136-2 to query board 120-3 by associating the processed query 118-2 with query board 120-3.

Since some documents such as the private datastore document 128-3 are stored in the private datastore 224, which has restricted access, the security component 104 may generate access control information (ACI) 350-n based on the account information associated with the client application 122-1 and the permissions contained in shared documents 112 such as shared documents 112-1, 112-2, and 112-3. The topic board component 110 may then filter the shared documents 112-1, 112-2, and 112-3 contained in the query board 120-3 based on the generated access control information 350. When the client application 122-1 has the proper security credentials as defined by the access control information 350, the topic board component 110 may provide the shared document 112-1, 112-2, and 112-3 to the client application 122-1. When the client application 122-1 does not have the proper security credentials as defined by the access control information 350, the topic board component 110 may filter one or more shared documents 112 from the writable topic board 116, and provide to the client application 122 only a subset of shared documents 112 that client application 112-1 having the associated account information has access to. This prevents unauthorized access to shared documents that are private and restricted to only a selective number of users and/or devices. For instance, client application 122-1 having the associated account information may have access to public datastore documents 128-1, 128-2 and private datastore document 128-3.

As indicated in the previous example, the search component 106 may also provide filtered search results 302-1 to the client application 122-1 based on the account information associated with client application 122-1. For instance, the public datastore documents 128-1, 128-2 may be documents stored in the public datastore 228 that is accessible by all users while private datastore document 128-3 is stored in the private datastore 224 and is accessible by only the client application 122-1 having the associated account information, or alternatively, a set of user accounts granted permission to the private datastore document 128-3 by the client application 122-1. Thus, selective versions of the writable topic board 116 and search results list 124 may be provided to the client application 122-1 based on the access control information 350.

Figure 3C:
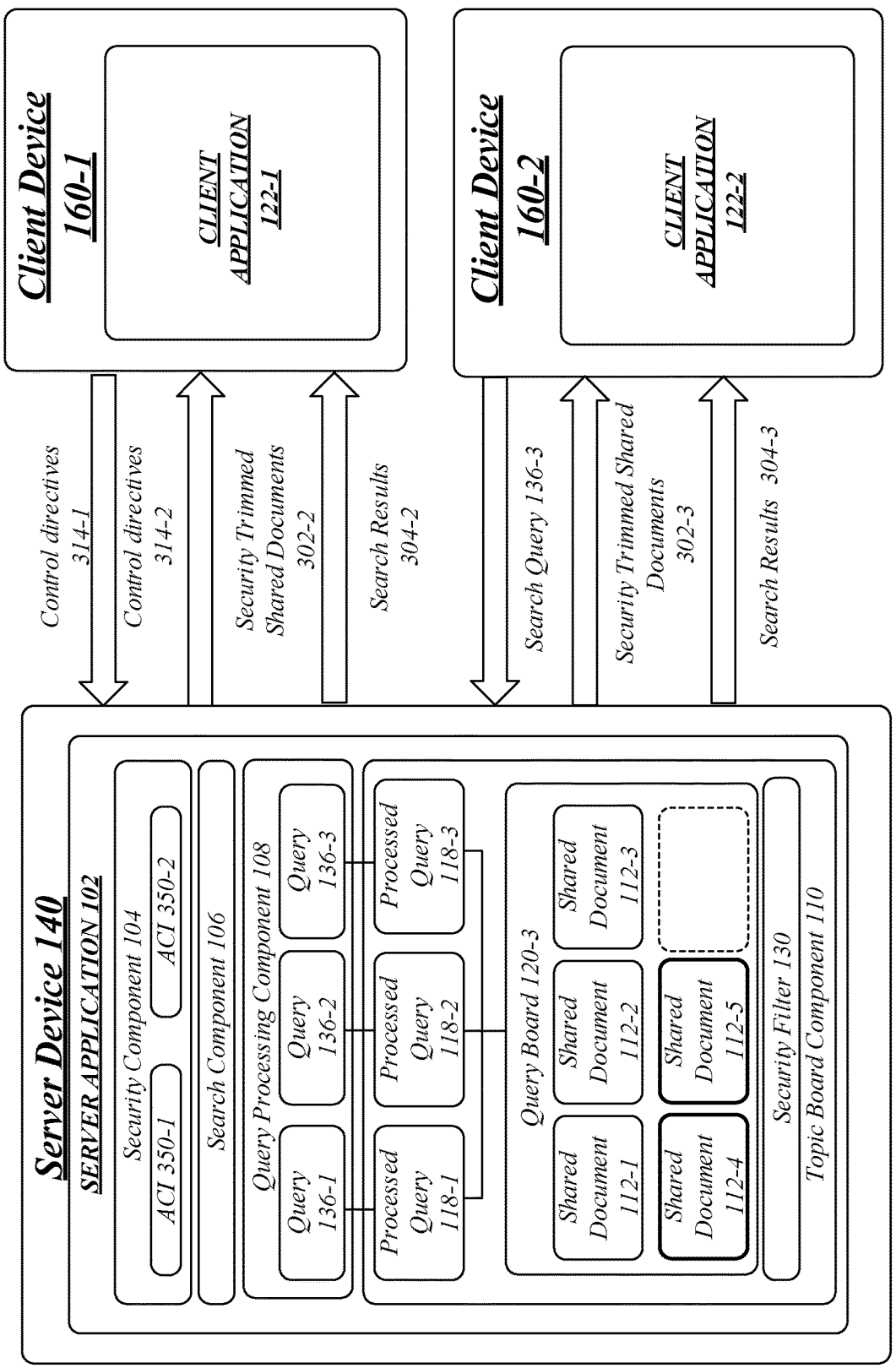
FIG. 3C illustrates an embodiment of a topic board system receiving control directives to share documents.

FIG. 3C illustrates an embodiment of the topic board system 100 after a user selects public datastore document 128-1, and private datastore document 128-3 for sharing by the client application 122-1 at time $t_3$ and receiving a new search query 136-3 at time $t_4$ from client application 122-2.

In response to the user inputs via gesture 302 and gesture 304, the client application 122-1 at time $t_3$ may generate control directives 314-1 and 314-2 to add public datastore document 128-1, private datastore document 128-3 to query board 120-3 for sharing and communicate or transmit the generated control directives 314-1 and 314-2 to the server application 102.

To add public datastore document 128-1 to the writable topic board 116 for sharing between users, the topic board component 110 may receive control directives 314-1 from client application 122-1 to add public datastore document 128-1 to the query board 120-3 for sharing on the writable topic board 116. The received control directives 314-1 may include the document reference associated with public datastore document 128-1. Based on the received document reference associated with public datastore documents 128-1, the topic board component 110 may identify the public datastore documents 128-1 to be added to the query board 120-3, and then add public datastore document 128-1 to the query board 120-3 associated with the writable topic board 116 to form shared documents 112-4.

To add private datastore document 128-3 to the writable topic board 116 for sharing between users, the topic board component 110 may receive control directives 314-2 from client application 122-1 to add private datastore document 128-3 to the query board 120-3 for sharing on the writable topic board 116. The received control directives 314-2 may include the document reference associated with private datastore document 128-3. Based on the received document reference associated with private datastore document 128-3, the topic board component 110 may identify the private datastore document 128-3 to be added to the query board 120-3, and then add private datastore document 128-3 to the query board 120-3 associated with the writable topic board 116 to form shared document 112-5.

After public datastore document 128-1 and private datastore document 128-3 are shared by client application 122-1 for search query 136-2, the query board 120-3 may include the newly added shared documents 112-4 and 112-5.

With respect to client application 122-1, the security component 104 may generate access control information 350-1 associated with the client application 122-1, in response to the newly added shared document 112-4 and 112-5. Furthermore, the security component 104 may generate the access control information 350-1 based on the permissions contained in shared documents 112-1, 112-2, 112-3, 112-4, and 112-5 and the account information associated with a user for the client application 122-1. Because shared document 112-4 was originally public datastore document 128-1, which is publically available to all users, the generated access control information 350-1 may not exclude shared document 112-4 from being provided to the client application 122-1. The generated access control information 350-1 may also not exclude shared document 112-5 from being provided to the client application 122-1 because, while shared document 112-5 was originally private datastore document 128-3, client application 122-1 having the associated account information may previously access the private datastore document 128-3 and accordingly, will also have access to shared document 112-5.

The security filter 130 of topic board component 110 may filter the shared documents 112-1, 112-2, 112-3, 112-4, and 112-5 contained in the query board 120 based on the generated access control information 350-1. The topic board component 110 may provide security trimmed shared documents 302-2 to the client application 122-1. The security trimmed shared documents 302-2 may include shared document 112-1, 112-2, 112-3, 112-4, and 112-5.

The search component 106 may also provide new search results 304-2 to the client application 122-1 and may filter or remove any search result items that are already provided to the search result list 124 of the client application 122-1 such that the search result items in the search results list 124 are mutually exclusive with the shared documents contained in the writable topic board 116. Accordingly, the search component 106 may provide search results 304-2 that include public datastore document 128-2, public datastore document 128-8 and private datastore document 128-9 but excludes public datastore document 128-1 and private datastore document 128-3 which are already provided in the security trimmed shared documents 302-2 as shared documents 112-4 and 112-5, respectively.

With respect to client application 122-2, the query processing component 108 at time $t_4$ may receive search query 136-3 from client application 122-2 and generate a processed query 118-3, the processed query 118-3 being associated with the search query 136-3. The topic board component 110 may map the search query 136-3 with the query board 120-3 based on similarity between the search query 136-2 and search query 136-3.

The security component 104 may generate the access control information 350-2 based on the permissions contained in shared document 112-1, 112-2, 112-3, 112-4, and 112-5 and the account information associated with the client application 122-2. Because shared document 112-4 was originally public datastore document 128-1, which is publically available to all users, the generated access control information 350-2 may not exclude shared document 112-4 from being provided to the client application 122-2. However, the generated access control information 352-2 may exclude shared document 112-5 from being provided to the client application 122-2 because, shared document 112-5 was originally private datastore document 128-3, which the client application 122-2 having the associated account information does not have access to, and thus, shared document 112-5 may be excluded.

The security filter 130 of topic board component 110 may filter the shared documents 112-1, 112-2, 112-3, 112-4, and 112-5 contained in the query board 120-3 based on the generated access control information 350-2. The topic board component 110 may provide security trimmed shared documents 302-3 to the client application 122-2. The security trimmed shared documents 302-3 may include shared document 112-1, 112-2, 112-3, and 112-4.

The search component 106 may also provide search results 304-3 to the client application 122-2 and may also filter or remove any search result items that are already provided to the writable topic board 116 of the client application 122-2 such that the search result items in the search results list 124 are mutually exclusive with the shared documents 112 contained in the writable topic board 116. Accordingly, the search component 106 may provide search results 304-3 that include public datastore documents 128-2 and 128-8, and private datastore document 128-10 but excludes public datastore document 128-1 which is already provided in the security trimmed shared documents 310-2 as shared document 112-4.

Figure 3D:
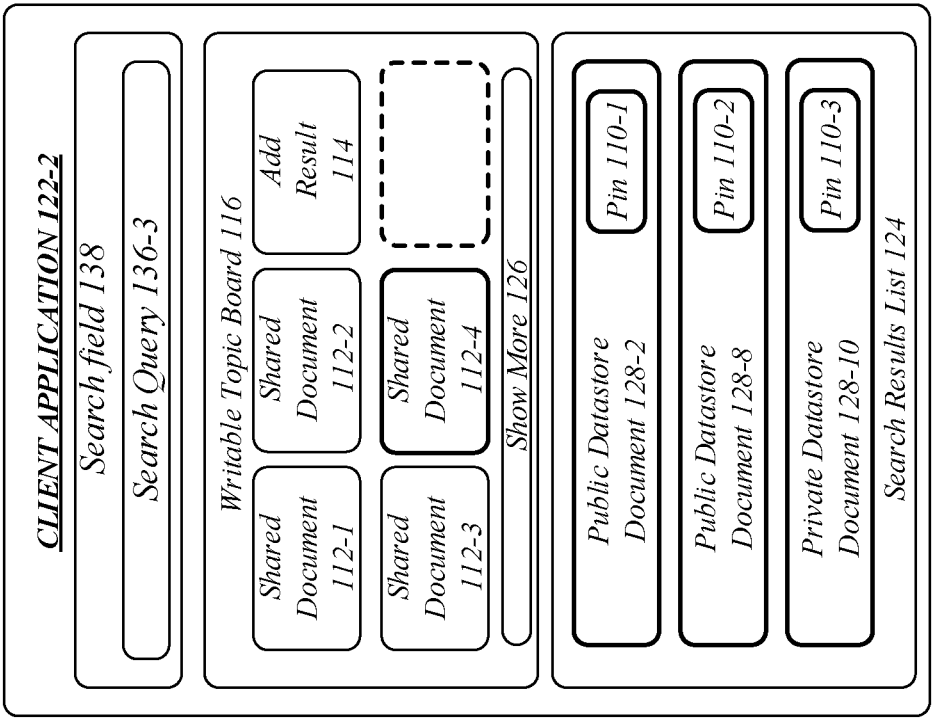
FIG. 3D illustrates an embodiment of a first user interface view of a topic board system after documents are shared.

FIG. 3D illustrates an embodiment of a user interface view 370 generated by the client application 122-1 after public datastore document 128-1 and private datastore document 128-3 are shared by client application 122-1 to form shared documents 112-4 and 112-5, respectively. The client application 122-1 may generate the user interface view 370 based at least partially on the security trimmed shared documents 302-2 and search results 304-2.

In the user interface view 370, the client 122-1 may include a search field 138 having the search query 136-2 comprising one or more search terms. The user interface view 370 of the client application 122-1 may include an updated search results list 124 which may include public datastore documents 128-2 and 128-8, and private datastore documents 128-9 as one or more search result items associated with the search query 136-2. The user interface view 370 may further include an updated writable topic board 116 managed by the topic board component 110 which may include share documents 112-1, 112-2, 112-3 as well as newly added shared documents 112-4 and 112-5.

Figure 3E:
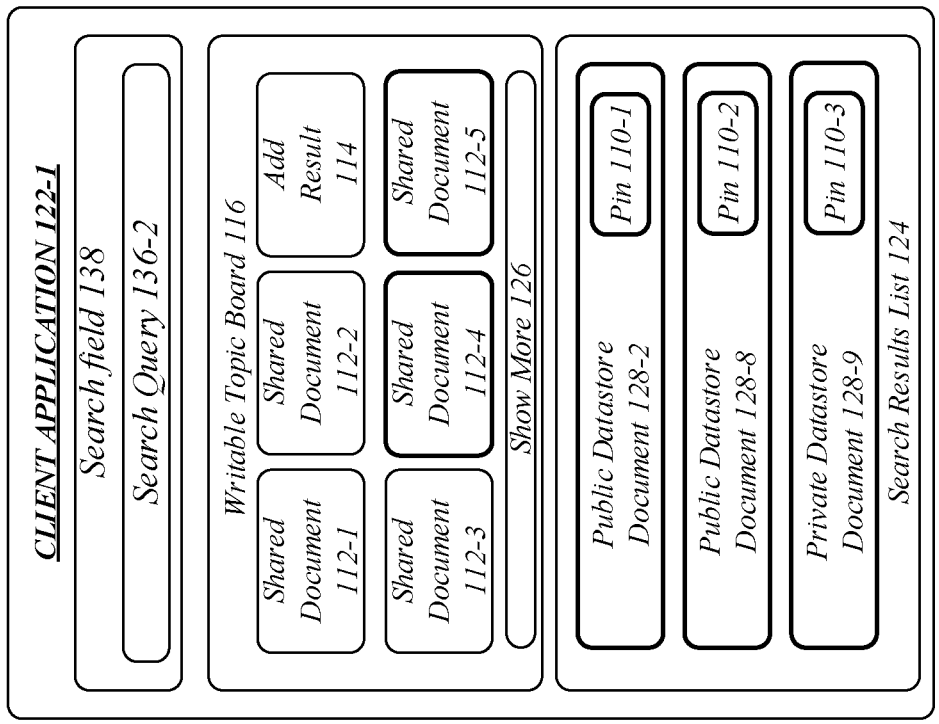
FIG. 3E illustrates an embodiment of a second user interface view of a topic board system after documents are shared.

FIG. 3E illustrates an embodiment of a user interface view 380 generated by the client application 122-2 after public datastore document 128-1 and private datastore document 128-3 are shared by client application 122-1 to form shared documents 112-4 and 112-5, respectively. Furthermore, the client application 122-2 may generate the user interface view 380 based at least partially on the security trimmed shared documents 302-3 and search results 304-3. In the user interface view 380, the client 302-2 may include a search field 138 with a user inputted search query 136-3 comprising one or more search terms.

In the user interface view 380, the client application 122-2 may include a search results list 124 which may include public datastore document 128-2 and 128-8 and private datastore documents 128-10 as one or more search result items associated with the search query 136-3. The user interface view 380 may include a writable topic board 116 managed by the topic board component 110 which may include share documents 112-1, 112-2, 112-3 as well as newly added shared documents 112-4. However, unlike user interface view 370, the newly shared document 112-5 may not be displayed because the client application 122-2 having an associated account information does not have access to the private datastore document 128-3 shared in the writable topic board 116 as shared document 112-5.

Figure 4A:
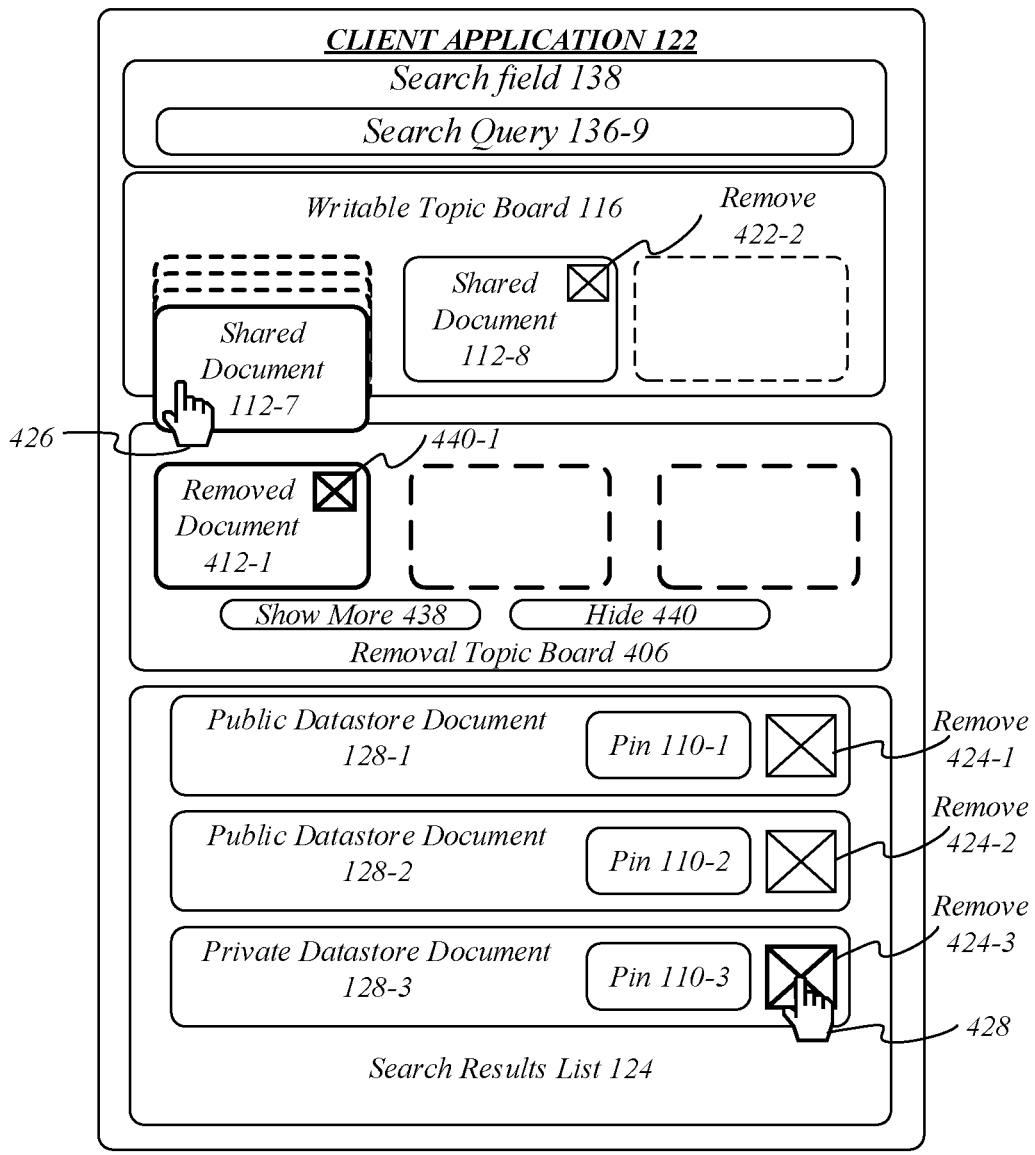
FIG. 4A illustrates an embodiment of a user interface view of a topic board system for removing documents.

FIG. 4A illustrates an embodiment of a user interface view 400 generated by the client application 122 based at least partially on the shared documents, removed documents, and search results provided by the topic board component 110, removal component 434, and search component 106, respectively. The user interface view 400 of the client application 122 may include a search field 138 for the input of search query 136-9 comprising one or more search terms.

The user interface view 400 of the client application 122 may include a search results list 124. The search results list 124 may include public datastore documents 128-1 and 128-2 and private datastore documents 128-3 as one or more search result items 127 associated with the search query 136-9. Each search result item 127 contained in the search result list 124 may include the document name, document summary, document type, document author, document reference, and/or document permissions associated with the public datastore document 128-1 and 128-2 and private datastore documents 128-3.

In the user interface view 400, search result items such as public datastore documents 128-1 and 128-2 and private datastore document 128-3 may also include GUI widgets such as pin 110-1, pin 110-2 and 110-3 to pin the document the writable topic board 116 for sharing between users. Furthermore, search result items such as public datastore document 128-1 and 128-2 and private datastore documents 128-3 may also include GUI widgets remove 424-*p* such as remove 424-1, remove 424-2 and remove 424-3 to remove or hide search result items such as public datastore document 128-1 and 128-2 and private datastore documents 128-3 from the search result list 124.

Figure 4B:
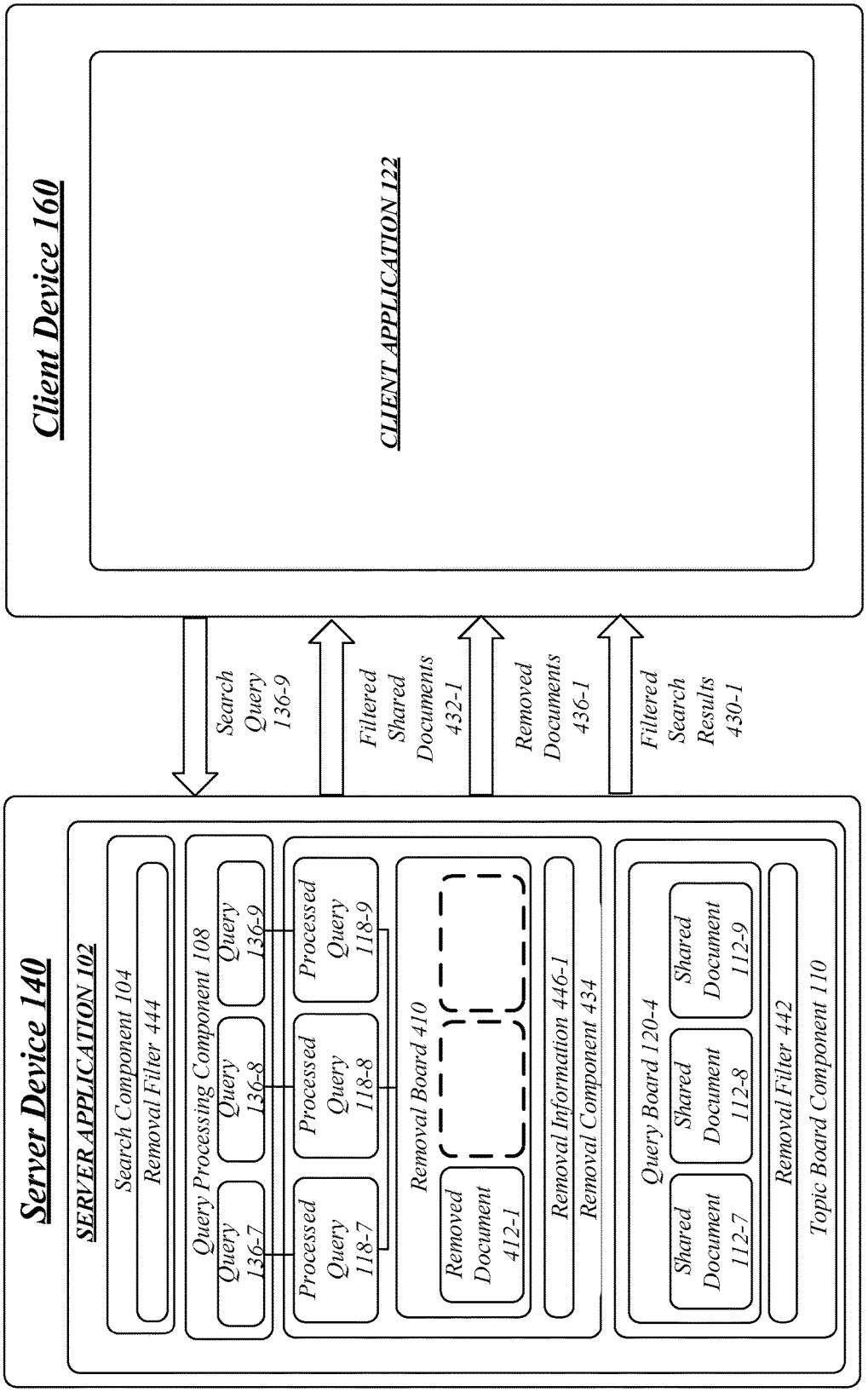
FIG. 4B illustrates an embodiment of a topic board system receiving a search query.

The user interface view 400 of the client application 122 may further include the writable topic board 116 managed by the topic board component 110. The writable topic board 116 may provide the shared documents 112 contained in a query board 120-4 as illustrated in FIG. 4B, where the search query 136-9 may be mapped to the query board 120-4 (not shown). The writable topic board 116 may include share documents 112-7, and 112-8 contained in the query board 120-4. However, the writable topic board 116 may not include a shared document 112-9 (not shown) which corresponds to removed document 412-1 because the shared document 112-9 has been previously added such that it will not be displayed in the writable topic board 116.

In the user interface view 400, each of the shared documents 112-7, and 112-8 may be displayed as tiles in the writable topic board 116. Each tile may further include the document name, document summary, document type, document author, document reference, and/or document permissions associated with shared documents 112-7 and 112-8. Furthermore, each tile may include GUI widgets remove 422-*o* such as GUI widget remove 422-2 to remove a shared document 112 such as shared document 112-8 from being shared and/or displayed on the writable topic board 116.

The user interface view 400 may further include a removal topic board 406. The removal topic board 406 may include removed document 412-1. The removed document 412-1 may be displayed as a tile in the removal topic board 406. Each tile may further include the document name, document summary, document type, document author, document references, and/or document permissions associated with the removed document 412-1. Furthermore, each tile may include GUI widgets remove 440-*n* such as GUI widget remove 440-1 to remove a previously removed document (e.g., removed document 412-1) from the removal topic board 406 such that a document corresponding to the removed document 412-1 may once again be displayed in the writable topic board 116 or the search results list 124. Additionally, the removal topic board 406 may also include GUI widget show more 438 to display a complete list of removed documents and GUI widget hide 440 to hide the removal topic board 406 from being displayed in the user interface view 400. Moreover, when the removal topic board 406 is hidden, the text of GUI widget hide 440 may be changed to GUI widget show 440 (not shown). However, in order to maximize the amount of relevant information displayed to a user, it may be appreciated that the removal topic board 406, may be initially hidden or minimized state but may be expanded by selecting the GUI widget show more 438 and/or GUI Widget show 440.

With respect to removing shared documents and/or search result items in the search result list, the user interface view 400 of the client application 122 may accept a variety of user inputs such as user input via an input device such as a pointing device or gestures on a touch screen. For example, a user of client application 122 may use drag and drop operations to move shared document 112-7 into the removal topic board 406 to remove the shared document 112-7 from being displayed in the writable topic board 116 for client application 122 having an associated account information.

To remove shared document 112-7, the user of client application 122 may use gesture 426 to drag and drop the shared document 112-7 onto the removal topic board 406. To remove private datastore document 128-3, the user of client application 122 may use gesture 428 to select the GUI widget remove 424-3 to remove the private datastore document 414-3.

FIG. 4B illustrates an embodiment of the topic board system 100 with respect to user interface view 400 where the server application 102 receives the search query 136-9 from client application 122. In the one embodiment, the removal component 434 may generally be arranged to manage various removal boards 410-*q* associated with the search queries 136. In one embodiment, the removal board component 434 may be arranged to provide removed documents 436 to the users, create one or more removal boards 410 in response to receiving one or more search queries, associate received search queries with one or more removal boards 410, map the search queries 136 into a corresponding removal board 410 receiving a control directive to remove one or more shared document 112 from the writable topic board 116, add a document to the removal board 410 as a removed document 412, generate removal information 446 based on the removed documents 412 contained in the removal board 410 and other management functions.

In one embodiment, the removal component 434 may initially include a removal board 410 associated with processed queries 118-7 and 118-8. The processed queries 118-7 and 118-8 are further associated with search queries 136-7 and 136-8. Additionally, the search queries 136-7 and 136-8 have been previously mapped to removal board 410. In one embodiment, the query processing component 108 may then receive search query 136-9 at time $t_1$ and generate a processed query 118-9, the processed query 118-9 being associated with the search query 136-9.

The removal component 434 may identify an existing or previous search query similar to search query 136-9 and map search query 136-9 to removal board 410 based on similarity between search query 136-9 with respect to search query 136-7 and 136-8. For example, the removal component 434 may identify the search query 136-7 or search query 136-8 as being similar to search query 136-9 based on calculated similarity scores, and may map the search query 136-9 with the removal board 410 by associating the processed query 118-9 with the removal board 410. Thus, just like one or more search queries 136 mapped to a single query board 120 (e.g., a canonical query board), one or more search queries 136 may also be mapped into a removal board 410, so that there is generally one removal board 410 for each query board 120 mapped by one or more search queries 136 (e.g, a canonical query board). The removal component 434 may also generate removal information 446-1 based on the removed documents 412-1 contained in the removal board 410. The removal component 434 may further provide removed documents 436-1 to the client application 122.

Alternatively, if removal component 434 cannot identify an existing search query similar to search query 136-9, the removal component 434 may create a new removal board 410 and map newly created removal board 410 to the search query 136-9 by associating the processed query 118-9 with the new removal board.

It may be appreciated that like the topic board component 110, the removal component 434 may be configured to manage multiple companies, divisions, departments, and/or groups and as such, what may be removed as deemed to be less relevant to one company, division, department, and/or group may be relevant to another. Accordingly, some logical tenant isolation may also be required between removal boards 410 of different organizations and/or different entities within an organization. In those embodiments, the removal component 434 may also be configured to logically delineate the removal boards 410 based at least partially on organizational information associated with each user's account information, so that removal topic boards 406 are shared among users within the same organization and/or same entity within the organization.

In one embodiment, the search component 104 may receive the generated processed query 118-9 and generate search results. The generated search results may initially include public datastore documents 128-1 and 128-2 and private datastore document 128-3. However, the search component 104 may also include a removal filter 444 arranged to filter or remove search result items such as public datastore documents 128-1 and 128-2 and private datastore document 128-3 from the search results list 124 based on the generated removal information 446-1. After filtering the generated search results, the search component 104 may provide filtered search results 430-1 to the client application 122.

In one embodiment, the topic board component 110 may provide shared documents 112-7, 112-8, and 112-9 contained in query board 120 where the search query 136-9 may be mapped to the query board 120 (not shown). Additionally, the topic board component 110, may include a removal filter 442 arranged to filter or remove shared documents 112 from being provided the client application 122 and provide filtered shared documents 432-1 based on the generated removal information 446-1. For example, assuming, shared document 112-9 was previously added to the removal board 410 as removed document 412-1, the removal filter 442 may remove the shared document 112-9 from being provided to the client application 122.

Figure 4C:
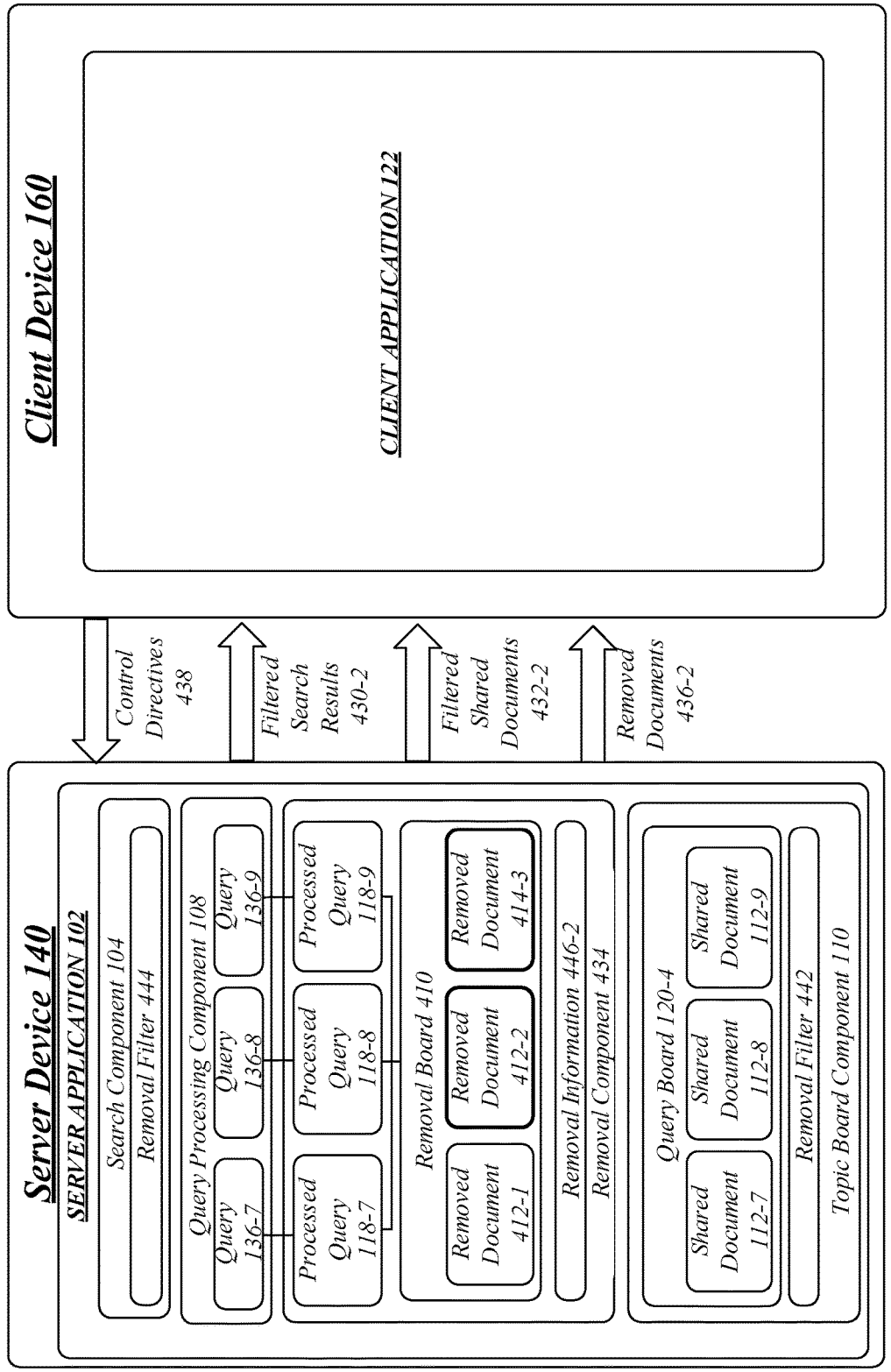
FIG. 4C illustrates an embodiment of a topic board system receiving control directives to remove documents.

FIG. 4C illustrates an embodiment of the topic board system 100 after and selecting shared document 112-7 and private datastore document 128-3 for removal from the writable topic board and the search results list 124, respectively.

In response to the user input via gesture 426 and gesture 428, the client application 122 at time $t_2$ may generate control directives 438 to add the documents to the removal topic board 406 for client application 122 having an associated account information. The client application 122 may communicate or transmit the generated control directives 438 to the server application 102.

To remove shared document 112-7 and private datastore document 128-3 from being displayed in the writable topic board 116 and search results list 124, the removal component 434 may receive control directives 438 at time $t_3$ from client application 122 to add shared document 112-7 and private datastore document 128-3 to the removal board 410. Based on the received control directives 438, the removal component 434 may add the private datastore document 128-3 to the removal board 410 to form removed document 412-2 and add the shared document 112-7 to the removal board 410 to form removed document 412-3.

After shared document 112-7 and private datastore document 128-3 are added to the removal board 410, the removal board 410 may include, in addition to removed document 412-1, the removed documents 412-2 and 414-3. The removal component 434 may provide the removed documents 436-2 which includes removed documents 412-1, 412-2, and 412-3 to the client application 122. Additionally, the removal component 434 may generate removal information 446-2 in response to the newly added removed documents 412-2 and 414-3. The generated removal information 446-2 may contain a list of removed documents which may include removed documents 412-2, 412-2, and 412-3.

In one embodiment, the search component 106 may provide filtered search results 430-2 to the client application 122, based on the generated removal information 446-2. The search component 104 including the removal filter 444 may filter or remove private datastore documents 414-3 from the search results list 124 based on the removal information 446-2. For example, because private datastore document 128-3, which corresponds to removed document 412-2, was previously added to the removal board 410, the filtered search results 430 may include public datastore document 128-1 and public datastore document 128-2 but may not include private datastore document 128-3.

In one embodiment, the topic board component 110 may provide filtered shared documents 432-2 to the client application 122 based on the generated removal information 446-2. The topic board component 110 including the removal filter 442 may filter or remove shared documents 112-7 and 112-9 from being provided the client application 122 based removal information 446-2. For example, because shared documents 112-7 and 112-9 were previously added to the removal board 410 as removed documents 412-3 and 412-1, respectively, the filtered shared documents 432-2 may include shared document 112-8 but may not include shared documents 112-7 and 112-9.

Figure 4D:
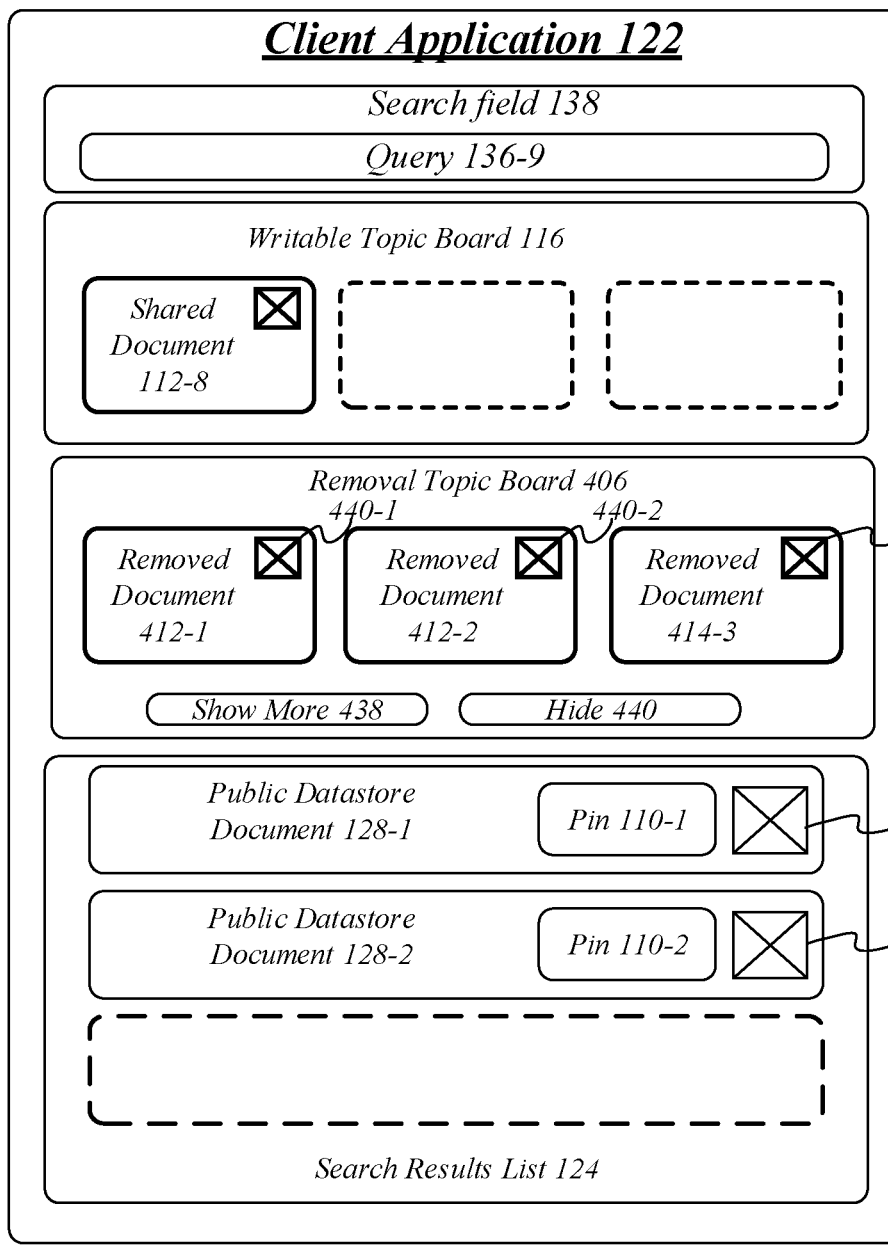
FIG. 4D illustrates an embodiment of a user interface view of a topic board system after documents are removed.

FIG. 4D illustrates an embodiment of a user interface view 480 generated by the client application 122 after shared document 412-2 and 414-3 were added to the removal board 410. The client application 122 may generate the user interface view 480 based at least partially on the filtered search results 430-2, filtered shared documents 432-2 and removed documents 436-2 received from the server application 102. In the user interface view 480, the client application 122 may include a search field 138 with a user inputted search query 136-9 comprising one or more search terms where the search query 136-9 is mapped to the removal board 410.

The user interface view 480 may also include a removal topic board 406 managed by the removal component 434. The removal topic board 406 may include removed document 412-1, 412-2, and 412-3. The user interface view 480 may include a writable topic board 116 managed by the topic board component 110. The writable topic board 116 may include shared document 112-8.

The user interface view 480 may further include a search results list 124 which may include public datastore documents 128-1 and 128-2. However, unlike user interface view 400, the shared document 112-7 and private datastore document 128-3 may not be displayed in the writable topic board 116 or the search results list 124 because shared document 112-7 and private datastore document 128-3 have been previously added to the removal topic board 406 and accordingly, are not displayed in the writable topic board 116 and search results list 124.

Figure 5A:
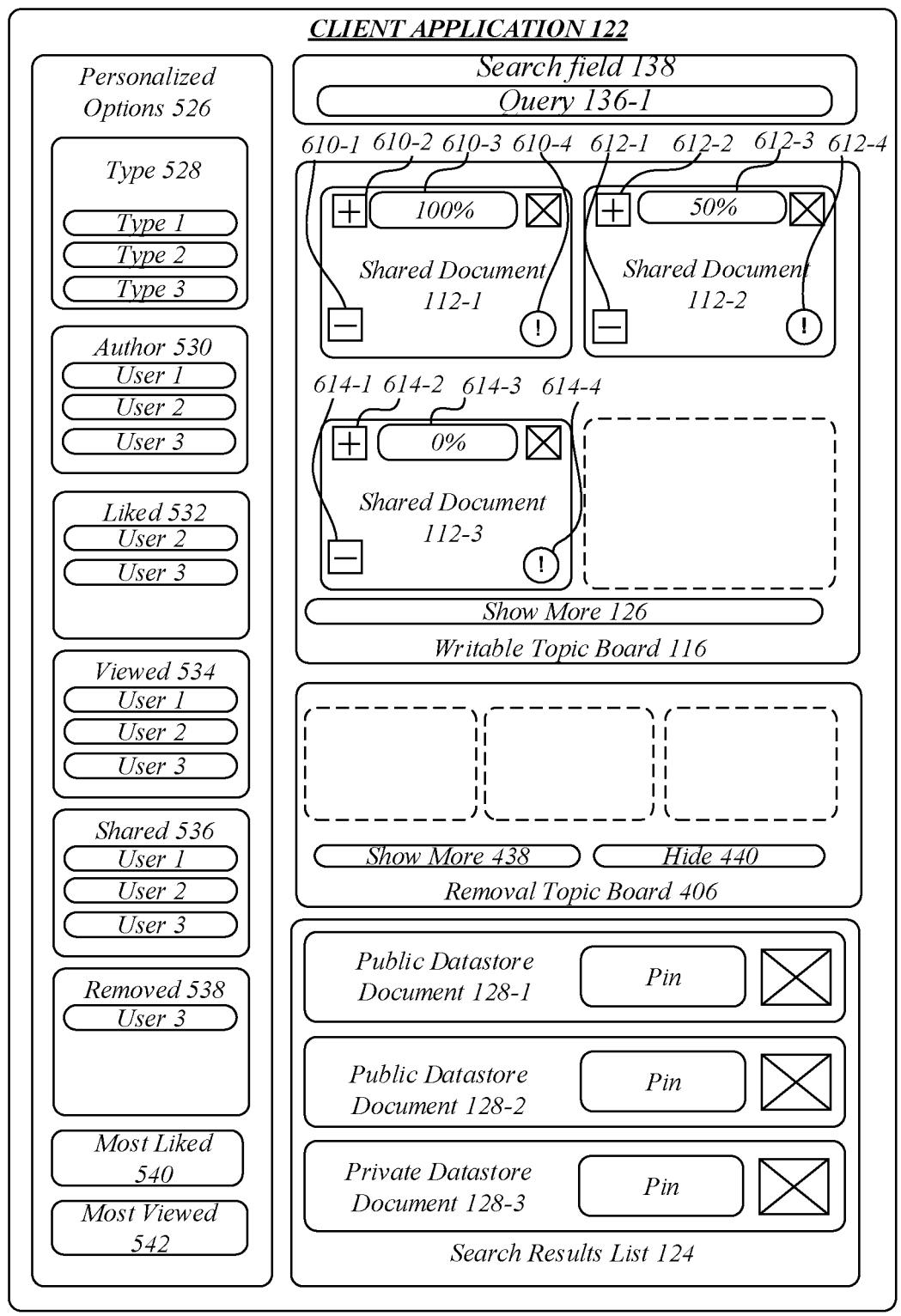
FIG. 5A illustrates an embodiment of user interface view of personalization and social options for shared documents in the topic board system.

FIG. 5A illustrates an embodiment of the user interface view 500 generated by the client application 122 based at least partially on the personalized shared documents, search results, and personalized options information 518 provided by the topic board component 110, and search component 106, and personalized options information 518 respectively. The user interface view 500 of the client application 122 may include a search field 138 for the input of search query 136-1 comprising one or more search terms.

The user interface view 500 may include a removal topic board 406 managed by removal component 434 and a search result list to display search results such as public datastore documents 128-1, 128-2, and private datastore documents 128-3 associated with search query 136-1. The user interface view 500 of the client application 122 may also accept a variety of user inputs such as user input via an input device such as a pointing device or gesture on a touch screen.

The user interface view 500 may also include the writable topic board 116 managed by the topic board component 110. The writable topic board 116 may provide the shared documents 112 contained in a query board such as query board 120-3, where the search query 136-1 may be mapped to the query board 120-3 as illustrated in FIG. 2. The writable topic board 116 may include share documents 112-1, 112-2 and 112-3.

In the user interface view 500, each of the shared documents 112-1, 112-2, and 112-3 may be displayed as tiles in the writable topic board 116. Each tile may include the document name, document summary, document type, document author, document references, and/or document permissions associated with shared documents 112-1, 112-2, and 112-3. Each tile may further include GUI widgets 610-1, 612-1, and 614-1 to enable a user to provide negative feedback with respect to shared documents 112-1, 112-2, and 112-3. Each tile may also include GUI widgets 610-2, 612-2, and 614-2 to enable a user to provide positive feedback with respect to shared documents 112-1, 112-2, and 112-3. Each tile may further include GUI widgets 610-3, 612-3, and 614-3 to enable users to view the feedback score associated with shared documents 112-1, 112-2, and 112-3. Each tile may still further include GUI widgets 610-4, 612-4, and 614-4 to enable a user to receive notifications of changes to shared documents 112-1, 112-2, and 112-3.

The user interface view 500 may include personalized options 526 which may enable a user of client application 122 to filter the shared documents 112 displayed in the writable topic board 116. The personalized options may include the document type 518, the document author 530, the document liked 532, the document viewed 534, document shared 536, document removed 540, and most liked 540 and most viewed 542.

The document type 528 option may enable a user to filter the shared documents 112 contained in the query board 120-3 based on the one or more document file types contained in the query board 120-3. The document file type 528 may be include one or more document file types representative of shared documents 112-1, 112-2, and 112-3 contained in the query board 120-3. A user input selecting one or more document file types such as type 1, type 2, and/or type 3 may filter or remove any shared document(s) 112 from being displayed in the writable topic board 116 that is not of the selected type(s). Exemplary document file types may include without limitation such as a word processing file type, a spreadsheet file type, a presentation file type, a PIM file type, a database file type, a publisher file type and so forth.

The document author 530 option may enable a user to filter the shared documents 112 contained in the query board 120-3 based on one or more users who authored the shared documents 112 contained in the query board 120-3. The document author 530 may be include one or more user identifiers representative of users that authored shared documents 112-1, 112-2, and 112-3 contained in the query board 120-3. A user input selecting one or more user identifiers such as user 1, user 2 and/or user 3 may filter or remove one or more shared documents 112 from being displayed in the writable topic board 116 that was not authored by the selected user identifier(s). Additionally or alternatively, a user input selecting "My Circle" may automatically select one or more user identifiers such as user 1, user 2, and/or user 3 to view shared documents 112 that were authored by other users (e.g., user 1, user 2, and/or user 3) determined to be socially closest to the user based on the peer information associated with the user's account information.

The document liked 532 option may enable a user to filter the shared documents 112 contained in the query board 120-3 based on the shared documents 112 contained in the query board 120-3 that received positive feedback or "liked" by users. The document liked 532 option may include one or more user identifiers representative of users that provided positive feedback for shared documents 112-1, 112-2, and 112-3 contained in the query board 120-3. A user input selecting one or more user identifiers such as user 2 and/or user 3 may filter or remove one or more shared documents 112 from being displayed in the writable topic board 116 that did not receive positive feedback. Additionally or alternatively, a user input selecting "My Circle" may automatically select one or more user identifiers such as user 2 and/or user 3 to view shared documents 112 that were "liked" by other users (e.g., user 2 and/or user 3) determined to be socially closest to the user based on the peer information associated with the user's account information.

The document viewed 534 option may enable a user to filter the shared documents 112 contained in the query board 120-3 based on the shared documents 112 contained in the query board 120-3 that were accessed or viewed by users. The document viewed 534 option may include one or more user identifiers representative of users that accessed or viewed the shared documents 112-1, 112-2, and 112-3 contained in the query board 120-3. A user input selecting one or more user identifiers such as user 1, user 2, and/or user 3 may filter or remove one or more shared documents 112 from the writable topic board 116 that were not accessed by the selected user identifier(s). Additionally or alternatively, a user input selecting "My Circle" may automatically select one or more user identifiers such as user 1, user 2, and/or user 3 to view shared documents 112 that were accessed by other users (e.g., user 1, user 2, and/or user 3) determined to be socially closest to the user based on the peer information associated with the user's account information.

The document shared 536 option may enable a user to filter the shared documents 112 contained in the query board 120-3 based on the shared documents 112 contained in the query board 120-3 that were shared by users. The document shared 536 option may include one or more user identifiers representative of users that added the shared documents 112-1, 112-2, and 112-3 to the query board 120-3 for sharing between users. A user input selecting one or more user identifiers such as user 1, user 2, and/or user 3 may filter or remove one or more shared documents 112 from the writable topic board 116 that were not shared by the selected user identifier(s). Additionally or alternatively, a user input selecting "My Circle" may automatically select one or more user identifiers such as user 1, user 2, and/or user 3 to view shared documents 112 that were shared by other users (e.g., user 1, user 2, and/or user 3) determined to be socially closest to the user based on the peer information associated with the user's account information.

The document removed 538 option may enable a user to filter the shared documents contained in the query board 120-3 that were removed by users. The document removed 538 option may include one or more user identifiers representative of users that removed the shared documents 112-1, 112-2, and 112-3 contained in thee query board 120-3 from being displayed in the writable topic board 116. A user input selecting one or more user identifiers such as user 3 may filter or remove one or more shared documents 112 from the writable topic board 116 that were not removed by the selected user identifier(s). Additionally or alternatively, a user input selecting "My Circle" may automatically select one or more user identifiers such as user 3 to view shared documents 112 that were removed by other users (e.g., user 3) determined to be socially closest to the user based on the peer information associated with the user's account information.

The document most liked 540 option may enable a user to rank the shared documents 112 contained in the query board 120-3 based on the feedback score associated with each shared document 112 contained in the query board 120-3. Furthermore, shared documents 112 that have a higher feedback score than other shared documents may be displayed first in the writable topic board 116 (e.g. in the top left) before other shared documents 112. For example, share document 112-1 having an associated feedback score of 100% would be displayed in the top left of the writable topic board 116 which may be followed by shared document 112-2 having an associated feedback score of 50%. Additionally, shared documents 112 with a number of negative feedbacks that exceed a threshold value may not be displayed at all in the writable topic board 116 and may be automatically added to the removal topic board 406 in order to prevent users from spamming the writable topic boards with irrelevant documents.

The document most viewed 542 option may enable a user to rank the shared documents 112 contained in the query board 120-3 based on their number of access or views associated with each shared document 112 contained in the query board 120-3. Furthermore, shared documents 112 that have a higher number of access or views as compared to other shared documents 112 may be displayed first in the writable topic board 116 (e.g. in the top left) before other shared documents 112.

Figure 5B:
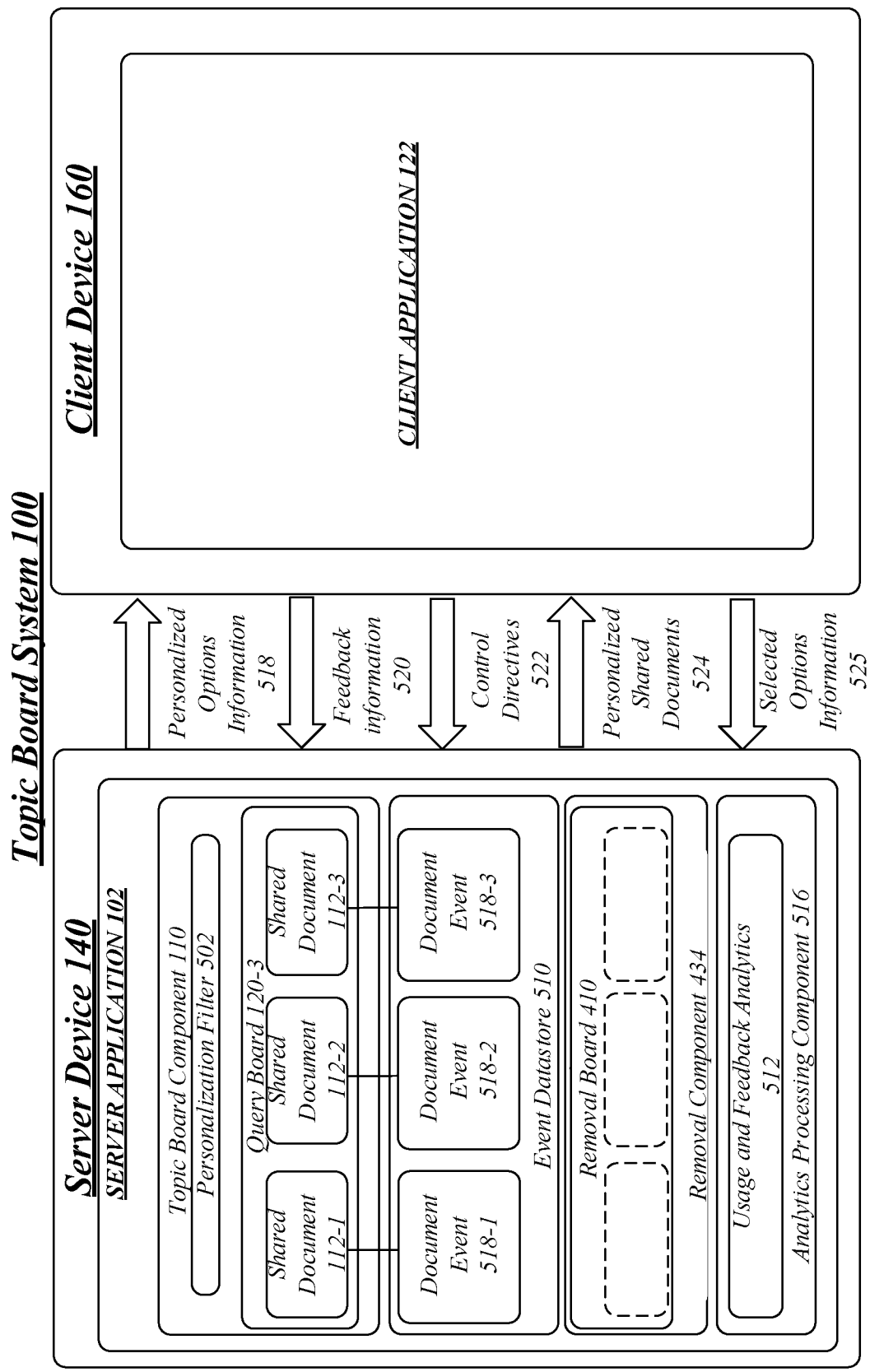
FIG. 5B illustrates an embodiment of a topic board system containing personalization and socialization options.

FIG. 5B illustrates an embodiment of the topic board system 100 for managing personalized and social options associated with shared documents 112. In one embodiment, the client application 122 may be arranged to generate feedback information 520 as one or more messages or signals and communicate or transmit the generated feedback information 520 to the server application 102, in response to user inputs to provide feedback and or to receive notification. The client may also be arranged to generate selected options information 525 as one or more messages or signals and communicate or transmit the selected options information 525 to the server application 102, in response to user inputs to select one or more personalized options 526. The client application 122 may also be arranged to update the user interface view in accordance with personalized options information 518, and personalized shared documents 524 received from server application 102.

In one embodiment, the server application 102 may include the topic board component 110 including a query board 120-3 where the search query 136-1 may be mapped to the query board 120-3. The query board 120-3 may include shared documents 112-1, 112-2, and 112-3.

In one embodiment, the server application 102 may also include an event datastore 510. The event datastore 510 may be arranged to receive control directives 522 and feedback information 520 for shared document 112-1, 112-2, and 112-3. The control directives 522 may include without limitation control directives to share one or more documents or to remove one or more documents from being displayed in the writable topic board 116 and search results list 124. The feedback information 520 may include without limitation positive feedbacks, negative feedbacks, and notification of changes associated shared documents 112-1, 112-2, and 112-3.

The event datastore 510 may be further arranged to create one or more document events 518-$q$ for shared documents 112, in response to receiving control directives or feedback information for the shared documents 112. The document event 518 may include without limitation document sharing information, document removal information, document viewed information, document feedback information, and document notification information. For example, the event datastore 510 may create document events 518-1, 518-2, and 518-3, in response to receiving feedback information 520 and/or control directives 522 for shared documents 112-1, 112-2 and 112-3.

The event datastore 510 may be arranged to associate a newly created document event 518 with a shared documents 112 that received feedback information or is modified by control directives. For example, the event datastore 510 may associate newly created document event 518-1 with shared document 112-1, when feedback information 520 contains a positive feedback for the shared document 112-1. Similarly, the event datastore 510 may associate the newly created document event 518-2 with shared document 112-2, when feedback information 520 contains a negative feedback for the shared document 112-2. Furthermore, the event datastore 510 may associate the newly created document event 518-3 with shared document 112-3, when received control directives 522 adds the shared document 112-3 to a removal board.

The event datastore 510 may be arranged to update the document events associated with the shared documents 112. For example, the event datastore 510 may receive feedback information 520 and identify the shared document 518-2 as having received a positive feedback. The event datastore 510 may then update the document event 518-2 associated with shared document 112-2 with the positive feedback.

In one embodiment, the server application 122 may further include analytics processing component 516 arranged generate usage and feedback analytics 512 based on one or more document events associated with one or more shared documents 112 contained in a query board. The usage and feedback analytics 512 may contain aggregate metadata of shared documents 112 contained in a query board. For example, the usage and feedback analytics may include a collection of users who authored, liked, viewed, shared, or removed one or more shared documents 112 contained in a query board. The usage and feedback analytics may also include a collection of document types, document names, associated with one or more shared documents 112 contained in a query board. Based on the usage and feedback analytics 512, the analytics processing component 516 may provide personalized options information 525 to the client application 122.

In one embodiment, server application 122 may further include topic board component 110 including a personalization filter 502 arranged to filter the shared documents 112 provided to the client application 122 based on selected options information 525 and generated usage and feedback analytics 512. Furthermore, based on the selected options information 525 and usage and feedback analytics 512, the personalization filter 502 may filter or remove shared document 112-1, 112-2, and 112-3 contained in the query board 120-3 and provide personalized options information 518 to the client application 122.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Furthermore, not all acts illustrated in a methodology may be required for a novel implementation.

FIG. 6 illustrates one embodiment of a logic flow 600. The logic flow 600 may be representative of some or all of the operations executed by one or more embodiments described herein.

In the illustrated embodiment shown in FIG. 6, the logic flow 600 may receive a search query from a client application at block 602. For example, the query processing component 108 may receive search query 136-2 from client application 122-1. The search query 136-2 may include one or more search terms.

The Logic flow 600 may generate a processed query based on the search query at block 604. For example, the query processing component 108 may generate processed query 118-2 based on the search query 136-2 by utilizing query expansion.

The Logic flow 600 may provide search results to the search result list for the search query at block 606. For example, search component 106 may provide search results 302-1 based on the processed query 118-2. The search results 302-1 may include one or more search result items such as public datastore document 128-1, private datastore document 128-2, and private datastore document 128-3.

The Logic flow 600 may map the search query into a query board based on similarity between the processed query and an existing processed query at block 608. For example, the topic board component 110 may map the search query 136-2 to query board 120-3 based on the similarity between the processed queries 118-2 and 118-1. To determine similarity, the topic board component 110 may calculate a similarity score between the processed queries 118-2 and 118-1. The topic board component 110 may determine the processed queries 118-2 and 118-1 to be similar with the calculated similarity score between the processed queries 118-2 and 118-1 is ranked highest among other similarity scores and meets or exceeds a threshold value.

The Logic flow 600 may receive a control directive from the client application to share a document at block 610. For example, the topic board component 110 may receive control directive 314-1 to share public datastore document 128-1. The control directives 314-1 may be generated by the client application 122-1, in response to gesture 302 dragging and dropping the public datastore document 128-1 from the search results list 124 to the writable topic board 116 of client application 122-1.

The Logic flow 600 may add the document to be shared to the query board as a shared document at block 612. For example, the topic board component 110 may add the public datastore document 128-1 as the shared document 112-4.

The Logic flow 600 may provide the shared document from the query board to the writable topic board at block 614. For example, the topic board component 110 may provide security trimmed shared documents 304-1 which includes shared document 112-4 contained in query board 120-3 to the writable topic board 116 of client application 122-1.

FIG. 7 illustrates one embodiment of a logic flow 700. The logic flow 700 may be representative of some or all of the operations executed by one or more embodiments described herein.

In the illustrated embodiment shown in FIG. 7, the logic flow 700 may create a removal board based on the search query at block 702. For example, the removal component 434 may create removal board 410, when removal component 434 cannot identify an existing search query similar to search query 136-9.

The logic flow 700 may map the search query to the removal board at block 704. For example, assuming removal component 434 did not identify an existing search query similar to search query 136-9, the topic board component 434 may map the removal board 410 to the search query 136-9 by associating the processed query 118-9 with the removal board 410.

The Logic flow 700 may receive a control directive to remove the shared document from the writable topic board for the search query at block 706. For example, the removal component 434 may receive control directives 438 to remove shared document 112-7 from being displayed in the writable topic board 116. The control directives 438 may be generated by the client application 122 in response to gesture 426 dragging and dropping the shared document 112-7 from the writable topic board 116 to the removal topic board 406.

The Logic flow 700 may add the shared document to the removal board as a removed document at block 708. For example, in response to receiving the control directives 438, the removal component 434 may add the shared document 112-7 to the removal board 410 to form removed document 412-3.

The Logic flow 700 may generate removal information based on the removal board at block 710. For example, the removal component 434 may generate removal information 446-2 based on the removed documents. The removal information 446-2 may include a collection of removed documents such as removed document 412-3.

The Logic flow 700 may filter the shared documents to be provided to the writable topic board based on the removal information at block 712. For example, the removal filter 442 of the topic board component 110 may provide filtered shared documents 432-2 based on the generated removal information 446-2 which may include shared document 112-8 but may not include shared document 112-7.

Figure 8:
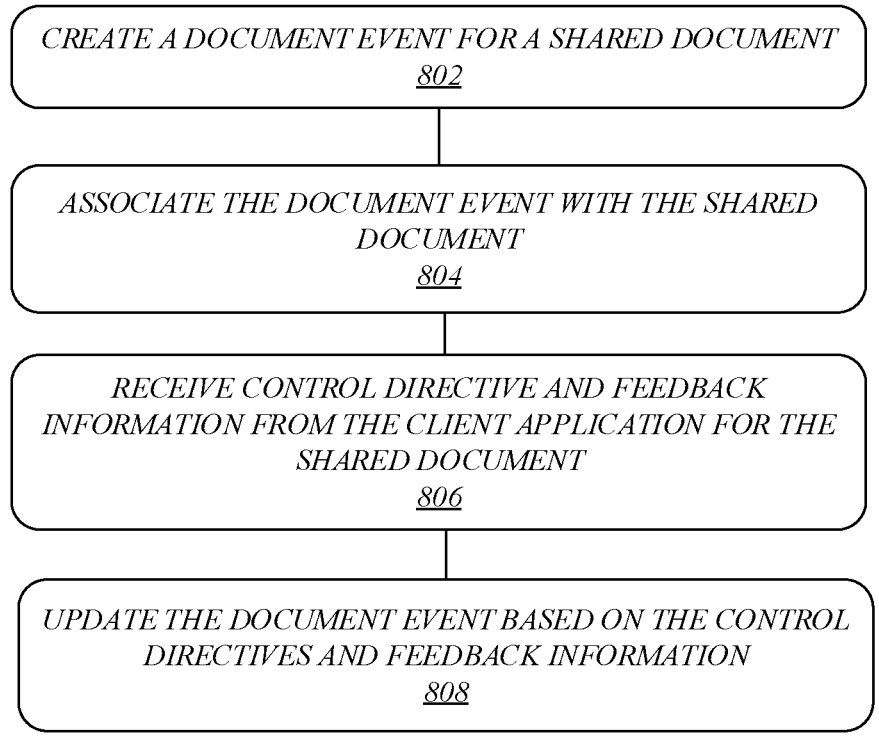
FIG. 8 illustrates an embodiment of a logic flow for an event datastore.

FIG. 8 illustrates one embodiment of a logic flow 800. The logic flow 800 may be representative of some or all of the operations executed by one or more embodiments described herein.

In the illustrated embodiment shown in FIG. 8, the logic flow 800 may create a document event for the shared document at block 802. For example, the event datastore 510 may create document event 518-1 in response to receiving feedback information 520 containing a positive feedback for shared document 112-1.

The Logic flow 800 may associate the document event with the shared document at block 804. For example, the event datastore 510 may associate the created document event 518-1 with shared document 112-1.

The Logic flow 800 may receive control directives and feedback information from the client application for the shared document at block 806. For example, the event datastore 510 may receive feedback information 520 including a negative feedback and control directives 522 to add the shared document 112-1 to the removal topic board 406 from the client application 122.

The Logic flow 800 may update the document event based on the control directives and feedback information at block 808. For example, the event datastore 510 may identify the shared document 518-1 as having received the negative feedback. The event datastore 510 may then update the document event 518-2 associated with shared document 112-1 with the negative feedback. The event datastore 510 may also identify the shared document 112-1 as having received a control directive to the removal topic board 406 from the client application 122, and update the document event 518-1 associated with shared document 112-1 with the control directive.

Figure 9:
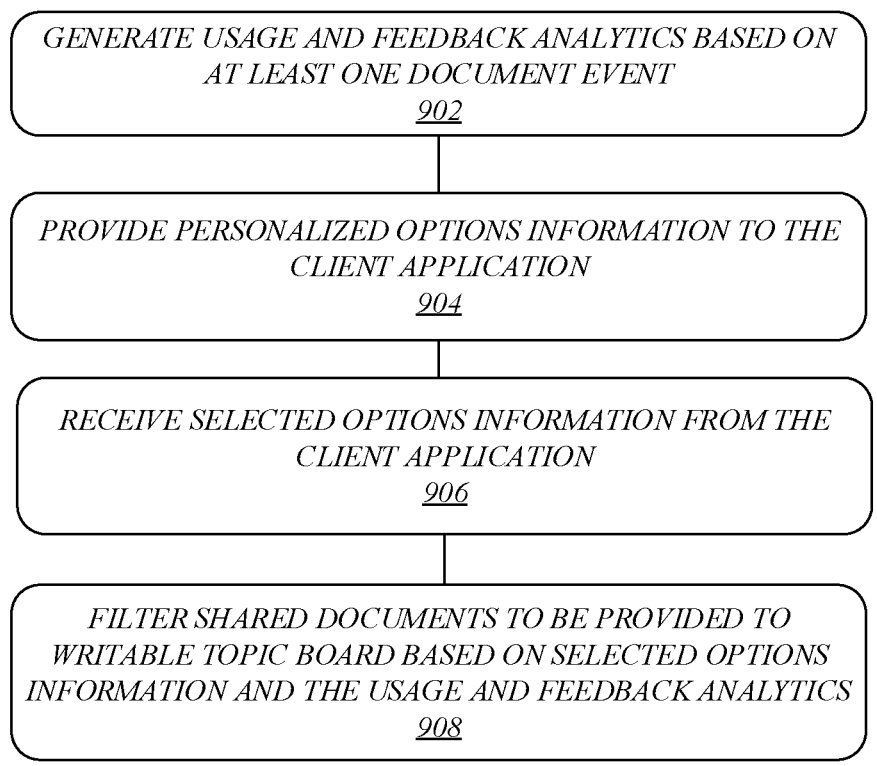
FIG. 9 illustrates an embodiment of a logic flow for an analytics processing component.

FIG. 9 illustrates one embodiment of a logic flow 900. The logic flow 900 may be representative of some or all of the operations executed by one or more embodiments described herein.

In the illustrated embodiment shown in FIG. 9, the logic flow 900 may generate usage and feedback analytics based on at least one document event at block 902. For example, the analytics processing component 516 may generate usage and feedback analytics 512 based on the document event 518-1, 518-2, and 518-3. The usage and feedback analytics may include without limitation a collection of users who authored, liked, viewed, shared, or removed one or more shared documents contained in a query board. The usage and feedback analytics may also include a collection of document types, document names, associated with one or more shared documents contained in query board 120-3

The logic flow 900 may provide personalized options information to the client application block 904. For example, the analytics processing component 516 may provide personalized options information 518, based on the generated usage and feedback analytics 512. The personalized options information 518 may include, for example, a list document types, a list of users who authored shared documents, a list of users who liked the shared documents, a list of users who viewed the shared documents, a list of users who removed the shared documents contained in the query board 120-3.

The logic flow 900 may receive selected options information from the client application at block 906. For example, the topic board component 110 may receive the selected options information 525 from the client application 122. The selected options information 525 may be generated by the client application 122 in response to user input of selecting one or more personalized options 526.

The logic flow 900 may filtering the shared documents to be provided to the writable topic board based on the selected options information and usage and the feedback analytics at block 908. For example, the personalization filter 502 may filter or remove shared documents 112-1, 112-2 or 112-3 contained in query board 120-3 based on the selected options information 525 and the usage and feedback analytics 512. The topic board component 110 may then provide personalized shared documents 524 to the client application.

Figure 10:
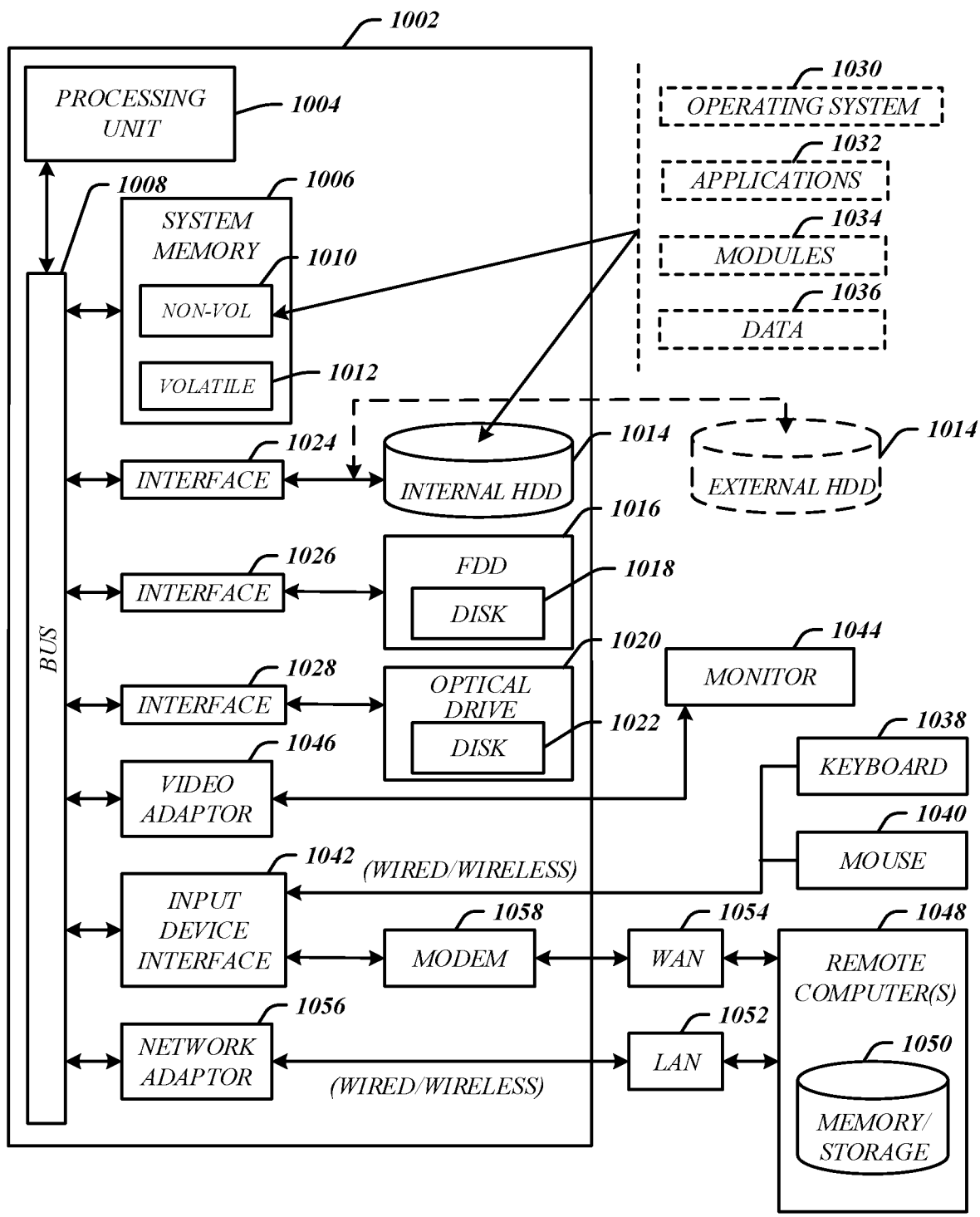
FIG. 10 illustrates an embodiment of a computing architecture.

FIG. 10 illustrates an embodiment of an exemplary computing architecture 1000 suitable for implementing various embodiments as previously described. In one embodiment, the computing architecture 1000 may comprise or be implemented as part of an electronic device. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors, including without limitation an AMD® Athlon®, Duron® and Opteron® processors; ARM® application, embedded and secure processors; IBM® and Motorola® DragonBall® and PowerPC® processors; IBM® and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1004.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of the system 100.

A user can enter commands and information into the computer 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Furthermore, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
a processor circuit; and
a server application for execution by the processor circuit, the server application comprising:
a topic board component to manage a writable topic board for shared documents selected from search results received in response to a query of public or private documents, the writable topic board being part of a user interface view of a client application and comprising one or more shared documents that can be modified by and shared among multiple users,
wherein the topic board component receives a control directive from a first client application associated with a first user to share at least one document with a second client application associated with a second user such that the user interface view associated with the writable topic board displays the at least one document.

2. The apparatus of claim 1, wherein the topic board component receives a second control directive to share at least one second document different from the at least one document such that the user interface view associated with the writable topic board displays the at least one second document and the at least one document.

3. The apparatus of claim 1, wherein the server application further comprises:
a removal board to receive a shared document in response to receiving a selection of the shared document for removal;
a removal component to generate removal information based on the removal board; and
a removal filter to filter or remove shared documents provided to the writable topic board based on the removal information.

4. The apparatus of claim 1, wherein the server application further comprises:
a query processing component to receive a first search query from a first user comprising one or more search terms and a second search query of a second user.

5. The apparatus of claim 4, wherein the server application further comprises:
a search component to provide search results for the first search query in a search result list, the search result list comprising one or more search result items.

6. The apparatus of claim 5, wherein the control directive to share the document is a control directive to pin a search result item contained in the search results list to the writable topic board for sharing between users.

7. The apparatus of claim 5, wherein the server application further comprises a user interface component to present the search result list and the writable topic board.

8. The apparatus of claim 4, wherein the topic board component maps the first and second search queries to a query board.

9. The apparatus of claim 8, wherein the topic board component maps the first and second search queries based on similarity between the first and second processed query.

10. The apparatus of claim 4, wherein the first search query occurs after the second search query.

11. The apparatus of claim 1, wherein the topic board component is to provide a shared document to the first client application and the second client application.

12. A computer-implemented method, comprising:
receiving a control directive from a client application associated with a first user to share a document, wherein the control directive causes the document to be shared with at least a second client application associated with a second user;
adding the document to be shared to a query board as a shared document; and
providing the shared document from the query board to a writable topic board such that a graphical user interface associated with the writable topic board displays the shared document such that the shared document can be modified by and shared among multiple users, the writable topic board being part of a user interface view of the client application and including one or more search result items as shared documents, the search result items being selected from search results received in response to a query of public or private documents.

13. The computer-implemented method of claim 12, further comprising:
providing search results to a search result list for the search query, the search results comprising a document and a plurality of other documents;
adding the document to the query board in response to a control directive from the client application to pin the document contained in the search results list to the writable topic board for sharing between users.

14. The computer-implemented method of claim 13, further comprising providing the search results containing documents in the search results list that are mutually exclusive with the shared documents in the writable topic board.

15. The computer-implemented method of claim 12, further comprising:
receiving a selection of the shared document for removal, and in response to receiving the selection of the shared document for removal:
adding the shared document to the removal board as a removed document;
generating removal information based on the removal board; and
filtering the shared documents to be provided to the writable topic board based on the removal information.

16. The computer-implemented method of claim 12, further comprising:
receiving control directives to a shared document contained in a private datastore of a remote device;
determining access control information to the private datastore of the remote device; and
filtering the shared document to be provided to the writable topic board based on the access control information.

17. The computer-implemented method of claim 12, further comprising:
creating a document event for the shared document;
associating the document event with the shared document;
receiving control directives and feedback information from the client application for the shared document; and
updating the document event based on the control directives and feedback information.

18. The computer-implemented method of claim 17, comprising:
generating usage and feedback analytics based on at least one document event;
providing personalized options information to the client application;
receiving selected options information from the client application; and
filtering the shared documents to be provided to the writable topic board based on the selected options information and usage and the feedback analytics.

19. The computer-implemented method of claim 17, comprising:
receiving a control directive to notify the client application associated with a user for the shared document; and
providing an update notification to the client application based on updates to the shared document.

20. An apparatus, comprising:
a processor circuit; and
a memory operatively connected to the processor circuit, the memory storing a server application for execution by the processor circuit which, when executed, causes the processor circuit to perform:
receiving a control directive from a client application associated with a first user to share a document, wherein the control directive causes the document to be shared with at least a second client application associated with a second user;
adding the document to be shared to a query board as a shared document; and
providing the shared document from the query board to a writable topic board such that a graphical user interface associated with the writable topic board displays the shared document such that the shared document can be modified by and shared among multiple users, the writable topic board being part of a user interface view of the client application and including one or more search result items as shared documents, the search result items being selected from search results received in response to a query of public or private documents.

* * * * *